(12) United States Patent
Chiffey et al.

(10) Patent No.: US 10,286,359 B2
(45) Date of Patent: May 14, 2019

(54) DIESEL OXIDATION CATALYST AND EXHAUST SYSTEM

(71) Applicant: Johnson Matthey Public Limited Company, London (GB)

(72) Inventors: Andrew Francis Chiffey, Ware (GB); John Benjamin Goodwin, Royston (GB); James Leeland, Royston (GB); Francois Moreau, Cambridge (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 14/603,537

(22) Filed: Jan. 23, 2015

(65) Prior Publication Data

US 2015/0202611 A1    Jul. 23, 2015

(30) Foreign Application Priority Data

Jan. 23, 2014    (GB) .................................. 1401115.9
Apr. 1, 2014     (GB) .................................. 1405871.3

(51) Int. Cl.
*B01D 53/94*     (2006.01)
*B01J 21/12*     (2006.01)
(Continued)

(52) U.S. Cl.
CPC ........... *B01D 53/944* (2013.01); *B01D 53/56* (2013.01); *B01D 53/62* (2013.01); *B01D 53/72* (2013.01);
(Continued)

(58) Field of Classification Search
CPC ............. B01D 53/9477; B01D 53/9472; B01J 23/6562; B01J 21/12
See application file for complete search history.

(56) References Cited

U.S. PATENT DOCUMENTS 4,003,976 A    1/1977    Komatsu et al.
5,045,519 A    9/1991    Meyer et al.
(Continued)

FOREIGN PATENT DOCUMENTS

DE    102007043529    3/2009
DE    102008003044    4/2009
(Continued)

OTHER PUBLICATIONS

Tikhov, et al.; Honeycomb catalysts for clean-up of diesel exhausts based upon the anodic-spark oxidized aluminum foilCatalysis Today, 53 (1999), 639-646.
(Continued)

*Primary Examiner* — James A Fiorito
(74) *Attorney, Agent, or Firm* — Gary D. Mangels

(57) ABSTRACT

An oxidation catalyst for treating an exhaust gas from a diesel engine, which oxidation catalyst comprises: a first washcoat region comprising platinum (Pt), manganese (Mn) and a first support material; a second washcoat region comprising a platinum group metal (PGM) and a second support material; and a substrate having an inlet end and an outlet end; wherein the second washcoat region is arranged to contact the exhaust gas at the outlet end of the substrate and after contact of the exhaust gas with the first washcoat region.

20 Claims, 2 Drawing Sheets

(51) Int. Cl.

| | | |
|---|---|---|
| *B01J 23/656* | (2006.01) | |
| *B01J 23/10* | (2006.01) | |
| *B01J 29/70* | (2006.01) | |
| *B01J 35/04* | (2006.01) | |
| *B01J 37/02* | (2006.01) | |
| *B01J 35/00* | (2006.01) | |
| *F01N 3/28* | (2006.01) | |
| *B01J 37/10* | (2006.01) | |
| *B01J 29/74* | (2006.01) | |
| *B01J 35/02* | (2006.01) | |
| *B01J 37/00* | (2006.01) | |
| *F01N 3/10* | (2006.01) | |
| *F01N 3/035* | (2006.01) | |
| *B01J 23/66* | (2006.01) | |
| *B01J 23/34* | (2006.01) | |
| *B01J 23/38* | (2006.01) | |
| *B01D 53/56* | (2006.01) | |
| *B01J 23/42* | (2006.01) | |
| *B01D 53/62* | (2006.01) | |
| *B01J 23/44* | (2006.01) | |
| *B01D 53/72* | (2006.01) | |
| *B01J 23/58* | (2006.01) | |
| *B01J 23/63* | (2006.01) | |
| *B01D 53/92* | (2006.01) | |
| *B01J 29/40* | (2006.01) | |
| *B01J 23/02* | (2006.01) | |
| *B01J 37/08* | (2006.01) | |

(52) U.S. Cl.
CPC ......... *B01D 53/922* (2013.01); *B01D 53/945* (2013.01); *B01D 53/9454* (2013.01); *B01D 53/9459* (2013.01); *B01D 53/9468* (2013.01); *B01D 53/9472* (2013.01); *B01D 53/9477* (2013.01); *B01J 21/12* (2013.01); *B01J 23/02* (2013.01); *B01J 23/10* (2013.01); *B01J 23/34* (2013.01); *B01J 23/38* (2013.01); *B01J 23/42* (2013.01); *B01J 23/44* (2013.01); *B01J 23/58* (2013.01); *B01J 23/63* (2013.01); *B01J 23/6562* (2013.01); *B01J 23/66* (2013.01); *B01J 29/40* (2013.01); *B01J 29/7007* (2013.01); *B01J 29/7015* (2013.01); *B01J 29/743* (2013.01); *B01J 29/7415* (2013.01); *B01J 35/0006* (2013.01); *B01J 35/023* (2013.01); *B01J 35/04* (2013.01); *B01J 37/0036* (2013.01); *B01J 37/0219* (2013.01); *B01J 37/0228* (2013.01); *B01J 37/0234* (2013.01); *B01J 37/0236* (2013.01); *B01J 37/0244* (2013.01); *B01J 37/0246* (2013.01); *B01J 37/086* (2013.01); *B01J 37/10* (2013.01); *F01N 3/035* (2013.01); *F01N 3/103* (2013.01); *F01N 3/106* (2013.01); *F01N 3/281* (2013.01); *F01N 3/2828* (2013.01); *F01N 3/2882* (2013.01); *B01D 2201/62* (2013.01); *B01D 2255/1021* (2013.01); *B01D 2255/1023* (2013.01); *B01D 2255/2042* (2013.01); *B01D 2255/2065* (2013.01); *B01D 2255/2073* (2013.01); *B01D 2255/2092* (2013.01); *B01D 2255/20707* (2013.01); *B01D 2255/20715* (2013.01); *B01D 2255/20776* (2013.01); *B01D 2255/30* (2013.01); *B01D 2255/40* (2013.01); *B01D 2255/50* (2013.01); *B01D 2255/502* (2013.01); *B01D 2255/504* (2013.01); *B01D 2255/902* (2013.01); *B01D 2255/903* (2013.01); *B01D 2255/9022* (2013.01); *B01D 2255/9032* (2013.01); *B01D 2255/91* (2013.01); *B01D 2255/912* (2013.01); *B01D 2257/404* (2013.01); *B01D 2257/502* (2013.01); *B01D 2257/702* (2013.01); *F01N 2330/02* (2013.01); *F01N 2330/06* (2013.01); *F01N 2370/02* (2013.01); *F01N 2510/06* (2013.01); *F01N 2510/0682* (2013.01); *F01N 2510/0684* (2013.01); *F01N 2570/10* (2013.01); *F01N 2570/12* (2013.01); *F01N 2570/14* (2013.01); *Y02A 50/2325* (2018.01); *Y02A 50/2341* (2018.01)

(56) References Cited

U.S. PATENT DOCUMENTS

| | | |
|---|---|---|
| 5,057,483 A | 10/1991 | Wan |
| 5,687,565 A * | 11/1997 | Modica ................. F01N 13/009 60/274 |
| 5,727,385 A | 3/1998 | Hepburn |
| 5,906,958 A | 5/1999 | Park et al. |
| 6,217,837 B1 | 4/2001 | Narula et al. |
| 6,221,804 B1 | 4/2001 | Yamada et al. |
| 6,338,831 B1 | 1/2002 | Strehlau et al. |
| 6,517,795 B1 | 2/2003 | Noweck et al. |
| 7,052,532 B1 | 5/2006 | Liu et al. |
| 8,449,852 B1 | 5/2013 | Sung et al. |
| 8,959,894 B2 | 2/2015 | Qi et al. |
| 2002/0132724 A1 | 9/2002 | Labarge et al. |
| 2003/0021745 A1 | 1/2003 | Chen |
| 2004/0065078 A1 | 4/2004 | Schafer-Sindlinger et al. |
| 2004/0067176 A1 | 4/2004 | Pfeifer et al. |
| 2005/0145827 A1 | 7/2005 | McCabe et al. |
| 2006/0032214 A1 | 2/2006 | Li et al. |
| 2009/0062117 A1 | 3/2009 | Kluge et al. |
| 2009/0100825 A1 | 4/2009 | Hiranuma et al. |
| 2009/0173063 A1 | 7/2009 | Boorse et al. |
| 2010/0233045 A1 | 9/2010 | Klim et al. |
| 2011/0274602 A1 | 11/2011 | Wanninger |
| 2012/0023909 A1 | 2/2012 | Lambert et al. |
| 2012/0240554 A1 | 9/2012 | Qi et al. |
| 2013/0142714 A1 | 6/2013 | Sung et al. |
| 2013/0156669 A1 | 6/2013 | Han et al. |
| 2015/0155422 A1* | 6/2015 | Henley ............. H01L 21/67092 225/106 |
| 2015/0165422 A1† | 6/2015 | Sung |
| 2015/0165423 A1 | 6/2015 | Sung et al. |
| 2015/0174564 A1 | 6/2015 | Muller-Stach et al. |

FOREIGN PATENT DOCUMENTS

| | | |
|---|---|---|
| DE | 102011109200 | 2/2012 |
| EP | 0945165 A2 | 9/1999 |
| EP | 1046423 | 10/2000 |
| EP | 1374978 | 6/2002 |
| EP | 1264629 | 12/2002 |
| EP | 1411107 | 4/2004 |
| EP | 2060756 | 5/2009 |
| EP | 2106841 | 10/2009 |
| FR | 2939329 | 6/2010 |
| GB | 2481057 | 12/2011 |
| JP | H06-304449 | 11/1994 |
| JP | H11-207190 | 8/1999 |
| KR | 2002-0031618 | 5/2002 |
| WO | 1997049481 | 12/1997 |
| WO | 1999034904 | 7/1999 |
| WO | 9947260 | 9/1999 |
| WO | 2000061289 | 10/2000 |
| WO | 2001014046 | 3/2001 |
| WO | 2002022241 | 3/2002 |
| WO | 2002040151 | 5/2002 |
| WO | 2004022935 | 3/2004 |
| WO | 2006044974 | 4/2006 |
| WO | 2007077462 A1 | 7/2007 |
| WO | 2009118188 | 10/2009 |
| WO | 2009118189 | 10/2009 |

(56) References Cited

FOREIGN PATENT DOCUMENTS

| | | |
|---|---|---|
| WO | 2009118190 | 10/2009 |
| WO | 2009120866 | 10/2009 |
| WO | 2010002486 | 1/2010 |
| WO | 2011080525 A1 | 7/2011 |
| WO | 2011092517 | 8/2011 |
| WO | 2011092519 | 8/2011 |
| WO | 2011092521 | 8/2011 |
| WO | 2011092523 | 8/2011 |
| WO | 2011092525 | 8/2011 |
| WO | 2012120292 A1 | 9/2012 |
| WO | 2012166868 A1 | 12/2012 |
| WO | 2013082367 | 6/2013 |
| WO | 2014080220 A1 | 5/2014 |
| WO | 2015095056 | 6/2015 |
| WO | 2015110819 | 7/2015 |

OTHER PUBLICATIONS

Wu et al.; Synthesis of CeO2—MnOx mixed oxides and catalytic performance under oxygen-rich conditionCatalysis Today, 126 (2007), 430-435.

Jeong et al.; Characteristics of catalytic oxidation for carbon black simulating diesel particulate matter over promoted Pt/Al2O3 catalyst assembled in two stage; Abstract of I. Mech. E. Conference on Internal Combustion Engines, London Dec. 2007, Paper No. C660/043/07.).

Horiuchi et al.; The effects of flow-through type oxidation catalysts on the particulate reduction of 1990s diesel engines; Abstract of SAE 900600 (1990).

Jeong et al.; Catalytic oxidation for carbon-black simulating diesel particulate matter over promoted Pt/Al2O3 catalysts Industrial and Engineering Chemistry 14 (2008) 830-835.

Kim et al.; Strontium-Doped Perovskites Rival Platinum Catalysts for Treating NOx in Simulated Diesel Exhaust; Science, (2010), 327 (5973), 1624-1627.

Paulson et al; New developments in diesel oxidation catalysts; Abstract of SAE Commercial Vehicle Emissions 2008 SP-2217.

\* cited by examiner
† cited by third party

DIESEL OXIDATION CATALYST AND EXHAUST SYSTEM

CROSS REFERENCE TO RELATED APPLICATIONS

This application claims priority benefit to Great Britain Patent Application No. 1401115.9 filed on Jan. 23, 2014, and to Great Britain Patent Application No. 1405871.3 filed on Apr. 1, 2014, all of which are incorporated herein by reference.

FIELD OF THE INVENTION

The invention relates to an oxidation catalyst for a diesel engine and to an exhaust system for a diesel engine comprising the oxidation catalyst. The invention also relates to methods and uses of the oxidation catalyst for treating an exhaust gas from a diesel engine.

BACKGROUND TO THE INVENTION

Diesel engines produce an exhaust emission that generally contains at least four classes of pollutant that are legislated against by inter-governmental organisations throughout the world: carbon monoxide (CO), unburned hydrocarbons (HCs), oxides of nitrogen ($NO_x$) and particulate matter (PM). Emissions standards for diesel engines, whether stationary or mobile (e.g. vehicular diesel engines), are being progressively tightened. There is a need to provide improved catalysts and exhaust systems that are able to meet these standards, which are cost-effective.

For diesel engines, an oxidation catalyst (known as a diesel oxidation catalyst (DOC)) is typically used to treat the exhaust gas produced by such engines. Diesel oxidation catalysts generally catalyse the oxidation of (1) carbon monoxide (CO) to carbon dioxide ($CO_2$), and (2) HCs to carbon dioxide ($CO_2$) and water ($H_2O$). Exhaust gas temperatures for diesel engines, particularly for light-duty diesel vehicles, are relatively low (e.g. about 400° C.) and so one challenge is to develop durable catalyst formulations with low "light-off" temperatures.

The activity of oxidation catalysts, such as DOCs, is often measured in terms of its "light-off" temperature, which is the temperature at which the catalyst starts to perform a particular catalytic reaction or performs that reaction to a certain level. Normally, "light-off" temperatures are given in terms of a specific level of conversion of a reactant, such as conversion of carbon monoxide. Thus, a $T_{50}$ temperature is often quoted as a "light-off" temperature because it represents the lowest temperature at which a catalyst catalyses the conversion of a reactant at 50% efficiency.

Exhaust systems for diesel engines may include several emissions control devices. Each emissions control device has a specialised function and is responsible for treating one or more classes of pollutant in the exhaust gas. The performance of an upstream emissions control device can affect the performance of a downstream emissions control device. This is because the exhaust gas from the outlet of the upstream emissions control device is passed into the inlet of the downstream emissions control device. The interaction between each emissions control device in the exhaust system is important to the overall efficiency of the system.

Oxidation catalysts, such as diesel oxidation catalysts (DOCs), typically oxidise carbon monoxide (CO) and hydrocarbons (HCs) in an exhaust gas produced by a diesel engine. Diesel oxidation catalysts can also oxidise some of the nitric oxide (NO) that is present in the exhaust gas to nitrogen dioxide ($NO_2$). Even though nitrogen dioxide ($NO_2$) is itself a pollutant, the conversion of NO into $NO_2$ can be beneficial. The $NO_2$ that is produced can be used to regenerate particulate matter (PM) that has been trapped by, for example, a downstream diesel particulate filter (DPF) or a downstream catalysed soot filter (CSF). Generally, the $NO_2$ generated by the oxidation catalyst increases the ratio of $NO_2$:NO in the exhaust gas from the outlet of the oxidation catalyst compared to the exhaust gas at the inlet. This increased ratio can be advantageous for exhaust systems comprising a downstream selective catalytic reduction (SCR) catalyst or a selective catalytic reduction filter (SCRF™) catalyst. The ratio of $NO_2$:NO in the exhaust gas produced directly by a diesel engine may be too low for optimum SCR or SCRF catalyst performance.

Whilst it is generally advantageous to include an oxidation catalyst, such as a DOC, that has good $NO_2$ generation activity in an exhaust system, the use of an oxidation catalyst in this way can be problematic when seeking to obtain optimum performance from a downstream emissions control device (e.g. an SCR or SCRF™ catalyst). The average amount of $NO_2$ that is generated by an oxidation catalyst at a given exhaust gas temperature can vary considerably over its lifetime. This can lead to difficulties in calibrating the dosing of the nitrogenous reductant for performing active SCR.

SUMMARY OF THE INVENTION

Catalysts that are used to oxidise carbon monoxide (CO), hydrocarbons (HCs) and sometimes also oxides of nitrogen ($NO_x$) in an exhaust gas emitted from a compression ignition engine generally comprise at least one platinum group metal, such as platinum or palladium. Platinum is more active than palladium at catalysing the oxidation of CO and HCs in the exhaust gas from a compression ignition engine and the inclusion of palladium in such catalysts was generally avoided because of its susceptibility to poisoning by sulphur. However, the use of ultra-low sulphur fuels, the relative cost of palladium to platinum, and improvements in catalyst durability that can be obtained by inclusion of palladium have resulted in catalyst formulations comprising palladium, especially formulations comprising both palladium and platinum, becoming favoured.

Even though, in general, the cost of palladium has historically been lower than that of platinum, both palladium and platinum are expensive metals. Oxidation catalysts that show improved catalytic activity without increasing the total amount of platinum and palladium, or that show similar catalytic activity to existing oxidation catalysts with a lower amount of platinum and palladium, are desirable.

The inventors have surprisingly found that an oxidation catalyst having advantageous activity can be obtained when a combination of (i) manganese and (ii) platinum is included in a catalyst formulation. Such catalysts have been found to have excellent low temperature CO oxidation activity. The catalysts are particularly effective in converting relatively high levels of CO in exhaust gas produced by the compression ignition engine, particularly at temperatures below 250° C. The catalysts may also show good oxidation activity towards HCs. The relatively low temperature oxidation activity of the catalyst renders it particularly suitable for use in combination with other emissions control devices in an exhaust system.

The inventors have also found that excellent activity toward the oxidation of nitric oxide (NO) in an exhaust gas from a diesel engine can be obtained when using this combination. Platinum is expensive and is often included in oxidation catalysts in relatively large amounts for, amongst other things, its oxidation activity toward NO. The inclusion of manganese (Mn) in combination with platinum (Pt) may result in an improvement in NO oxidation activity or allow the use of a reduced amount of Pt to achieve a given level of NO oxidation.

The invention provides an oxidation catalyst for treating an exhaust gas from a diesel engine, which oxidation catalyst comprises: a first washcoat region comprising platinum (Pt), manganese (Mn) and a first support material; a second washcoat region comprising a platinum group metal (PGM) and a second support material; and a substrate having an inlet end and an outlet end. The second washcoat region is preferably arranged to contact the exhaust gas at the outlet end of the substrate and after contact of the exhaust gas with the first washcoat region.

The oxidative activity of the combination of Pt and Mn toward carbon monoxide (CO) and nitric oxide (NO) can be particularly advantageous when certain alumina based materials are used as a support material.

The invention further provides an exhaust system for a diesel engine. The exhaust system comprises an oxidation catalyst of the invention and an emissions control device.

The amount of $NO_2$ in an exhaust gas can affect the performance of a downstream emissions control device for the selective catalytic reduction of oxides of nitrogen ($NO_x$). Selective catalytic reduction (SCR) catalysts and selective catalytic reduction filter (SCRF™) catalysts for treating $NO_x$ (e.g. $NO_2+NO$) often require the ratio of $NO_2$ to NO in the inlet gas to be within a specific range for optimum catalytic performance. The optimal $NO_2$ proportion of $NO_x$ typically depends on the type of composition used in the SCR or SCRF™ catalyst, but the ratio of $NO_2$ to NO in an exhaust gas directly from a diesel engine is usually too low for optimal performance of the catalyst.

The oxidation catalyst of the invention can be used to convert NO into $NO_2$ and thereby increase the amount of $NO_2$ in the exhaust gas that exits the catalyst in comparison to the amount of $NO_2$ in the exhaust gas at the inlet of the catalyst (i.e. the ratios of $NO_2:NO_x$ and $NO_2:NO$ in the exhaust gas that exits the oxidation catalyst are greater than the corresponding ratios of the exhaust gas at the inlet of the oxidation catalyst). The oxidation catalyst can alter the $NO_x$ composition of the exhaust gas for optimum SCR performance.

A problem with using an oxidation catalyst to "boost" the $NO_2$ content of an exhaust gas is that the NO oxidation activity of the oxidation catalyst usually varies over its lifetime. Generally, as the catalyst "ages" (i.e. the catalyst has been used over a prolonged period), the NO oxidation activity of the catalyst decreases. Whilst the amount of $NO_2$ in the exhaust gas that exits an "aged" oxidation catalyst may be sufficient for optimal performance of a downstream emissions control device (e.g. an SCR catalyst), this variation in the amount of $NO_2$ that is generated is problematic for calibrating the dosing of the nitrogenous reductant for performing active SCR.

It has been found that the oxidation catalyst of the invention can show relatively stable NO oxidation activity over its lifetime. Thus, the difference in NO oxidation activity of the oxidation catalyst in a fresh state (i.e. when it is "new" and has not been subjected to repeated, prolonged use) and an aged state is typically small.

A further aspect of the invention relates to a vehicle or an apparatus (e.g. a stationary or mobile apparatus). The vehicle or apparatus comprises a diesel engine and either the oxidation catalyst or the exhaust system of the invention.

The invention also relates to several uses and methods.

A first method aspect of the invention provides a method of treating an exhaust gas from a diesel engine. The method comprises either contacting the exhaust gas with an oxidation catalyst of the invention or passing the exhaust gas through an exhaust system of the invention. The expression "treating an exhaust gas" in this context refers to oxidising carbon monoxide (CO), hydrocarbons (HCs) and nitric oxide (NO) in an exhaust gas from a diesel engine.

A second method aspect provides a method of modulating the content of $NO_x$ in an exhaust gas from a diesel engine for an emissions control device. The method comprises: (a) controlling the $NO_x$ content of an exhaust gas by contacting the exhaust gas with an oxidation catalyst of the invention to produce a treated exhaust gas; and (b) passing the treated exhaust gas to an emissions control device.

A first use aspect of the invention relates to the use of an oxidation catalyst to treat an exhaust gas from a diesel engine, optionally in combination with an emissions control device. Generally, the oxidation catalyst is used to treat (e.g. oxidise) carbon monoxide (CO) and hydrocarbons (HCs) in an exhaust gas from a diesel engine.

In a second use aspect, the invention relates to the use of an oxidation catalyst to modulate the content of $NO_x$ in an exhaust gas from a diesel engine for an emissions control device (e.g. a downstream emissions control device).

A third use aspect relates to the use of an oxidation catalyst in the regeneration of an emissions control device having a filtering substrate (e.g. a downstream emissions control device having a filtering substrate).

A fourth use aspect relates to the use of manganese (Mn), preferably in combination with platinum (Pt), in an oxidation catalyst for a diesel engine to enhance oxidation of nitric oxide (NO) in an exhaust gas from the diesel engine.

A fifth use aspect relates to the use of manganese (Mn), preferably in combination with platinum (Pt), in an oxidation catalyst for a diesel engine to stabilise the NO oxidation activity of the oxidation catalyst over its lifetime.

In the first to fifth use aspects, the oxidation catalyst is an oxidation catalyst in accordance with the invention.

BRIEF DESCRIPTION OF THE DRAWINGS

FIG. 1 shows an oxidation catalyst comprising a first washcoat region (1) and a second washcoat region/zone (2) disposed on a substrate (3).

FIG. 2 shows an oxidation catalyst comprising a first washcoat region (1) and a second washcoat region/zone (2). The first washcoat region (1) is disposed directly on to the substrate (3). The second washcoat region/zone (2) is disposed on the first washcoat region (1).

FIG. 3 shows an oxidation catalyst comprising a first washcoat region (1) and a second washcoat region/zone (2). There is an overlap between the first washcoat region (1) and the second washcoat region/zone (2). A part of the first washcoat region (1) is disposed on the second washcoat region/zone (2). Both the first washcoat region (1) and the second washcoat region/zone (2) are disposed on the substrate (3).

FIG. 4 shows an oxidation catalyst comprising a first washcoat region (1) and a second washcoat region/zone (2).

There is an overlap between the first washcoat region (1) and the second washcoat region/zone (2). A part of the second washcoat region/zone (2) is disposed on the first washcoat region (1). Both the first washcoat region (1) and the second washcoat region/zone (2) are disposed on the substrate (3).

Figure 5:

FIG. 5 shows an oxidation catalyst comprising a first washcoat layer (1) and a second washcoat layer (2) disposed on a substrate (3). The second washcoat layer (2) is disposed on the first washcoat layer (1).

Figure 6:
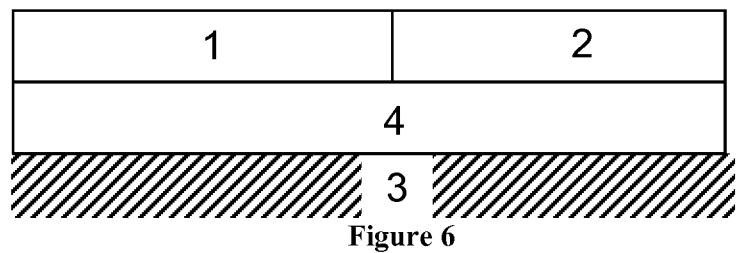

FIG. 6 shows an oxidation catalyst comprising a first washcoat zone (1) and a second washcoat region/zone (2). Both the first washcoat region/zone (1) and the second washcoat region/zone (2) are disposed on a third washcoat region/layer (4). The third washcoat region/layer (4) is disposed on a substrate (3).

Figure 7:
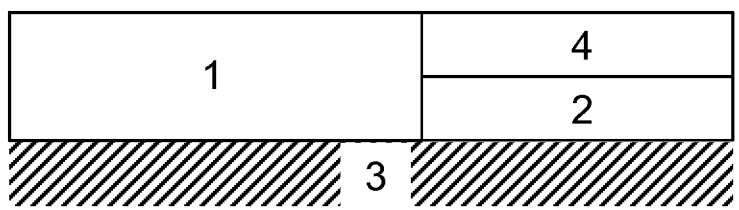

FIG. 7 shows an oxidation catalyst comprising a first washcoat zone (1), a second washcoat zone (2) and a third washcoat zone (4). Both the first washcoat zone (1) and the second washcoat zone (2) are disposed on a substrate (3). The third washcoat zone (4) is disposed on the second washcoat zone (2).

Figure 8:
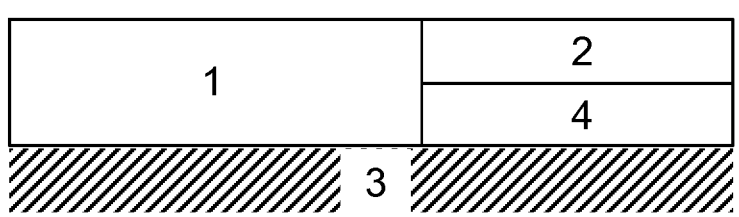

FIG. 8 shows an oxidation catalyst comprising a first washcoat zone (1), a second washcoat zone (2) and a third washcoat zone (4). Both the first washcoat zone (1) and the third washcoat zone (4) are disposed on a substrate (3). The second washcoat zone (2) is disposed on the third washcoat zone (2).

Figure 9:
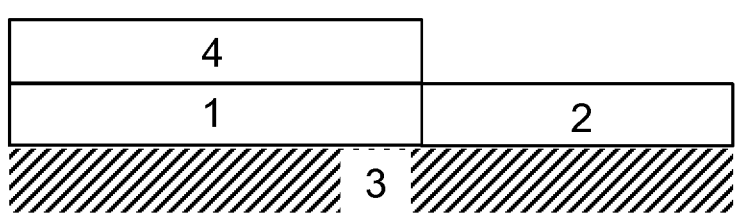

FIG. 9 shows an oxidation catalyst comprising a first washcoat zone (1), a second washcoat zone (2) and a third washcoat zone (4). Both the first washcoat zone (1) and the second washcoat zone (2) are disposed on a substrate (3). The third washcoat zone (4) is disposed on the first washcoat zone (1).

Figure 10:
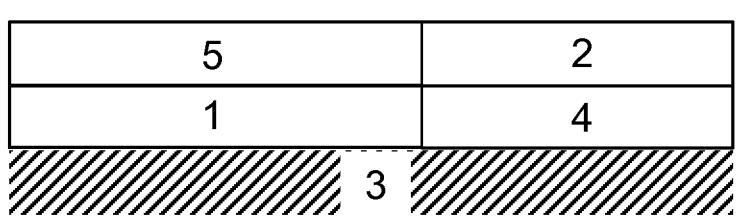

FIG. 10 shows an oxidation catalyst comprising a first washcoat zone (1), a second washcoat zone (2), a third washcoat zone (4) and a fourth washcoat zone (5). Both the first washcoat zone (1) and the third washcoat zone (4) are disposed on a substrate (3). The second washcoat zone (4) is disposed on the third washcoat zone (2). The fourth washcoat zone (5) is disposed on the first washcoat zone (1).

DETAILED DESCRIPTION OF THE INVENTION

The oxidation catalyst of the invention comprises, or may consist of, a first washcoat region, a second washcoat region and a substrate.

Typically, the second washcoat region is arranged to contact the exhaust gas at the outlet end of the substrate and after contact of the exhaust gas with the first washcoat region.

The catalyst may show advantageous oxidative activity (e.g. toward CO, HCs and NO) when it has an arrangement that facilitates the contact of the exhaust gas with the washcoat region containing the Pt and Mn shortly after the exhaust gas has entered the catalyst, and preferably before it has been in contact with the second washcoat region. In such an arrangement of the oxidation catalyst, as the exhaust gas enters the catalyst it first comes into contact with the first washcoat region for oxidising CO and HCs. After the exhaust gas has passed through or over the first washcoat region, it comes into contact with the second washcoat region before it finally passes through the outlet of the oxidation catalyst.

In general, the second washcoat region is arranged or oriented to contact exhaust gas after it has contacted the first washcoat region. Typically, the first washcoat region is arranged or oriented to contact exhaust gas before the second washcoat region. Thus, the first washcoat region may be arranged to contact exhaust gas as it enters the oxidation catalyst and the second washcoat region may be arranged to contact the exhaust gas as it leaves the oxidation catalyst. Examples of such arrangements are described herein.

The first washcoat region is for oxidising carbon monoxide (CO) and hydrocarbons (HCs), and optionally for oxidising nitric oxide (NO).

The first washcoat region comprises, or may consist essentially of, platinum (Pt), manganese (Mn) or an oxide thereof, and a first support material.

The platinum (Pt) is typically disposed or supported on the first support material. The platinum may be disposed directly onto or is directly supported by the first support material (e.g. there is no intervening support material between the platinum and the first support material). For example, platinum can be dispersed on the first support material.

The first washcoat region typically has a total loading of platinum of 5 to 300 g ft$^{-3}$. It is preferred that the first washcoat region has a total loading of platinum of 10 to 250 g ft$^{-3}$ (e.g. 75 to 175 g ft$^{-3}$), more preferably 15 to 200 g ft$^{-3}$ (e.g. 50 to 150 g ft$^{-3}$), still more preferably 20 to 150 g ft$^{-3}$.

The first washcoat region may further comprise palladium, such as palladium disposed or supported on the first support material.

Typically, first washcoat region comprises a ratio of platinum to palladium by total weight of ≥1:1 (e.g. Pt:Pd 1:0 to 1:1 or 10:1 to 1:1), preferably ≥2:1 (e.g. Pt:Pd 1:0 to 2:1 or 10:1 to 2:1), more preferably ≥4:1 (e.g. Pt:Pd 1:0 to 4:1 or 10:1 to 4:1), and even more preferably ≥10:1 (e.g. Pt:Pd 1:0 to 10:1).

When the first washcoat region comprises palladium (Pd), then preferably the platinum (Pt) and the palladium (Pd) are the only platinum group metals (i.e. in the first washcoat region).

The first washcoat region may comprise a zeolite catalyst, such as a zeolite catalyst as herein defined below. When the first washcoat region comprises a zeolite catalyst, then the first washcoat region may comprise a ratio by total weight of platinum to the palladium supported on the second support material is ≥2:1 (e.g. Pt:Pd 1:0 to 2:1), more preferably ≥4:1 (e.g. Pt:Pd 1:0 to 4:1).

It is generally preferred that the first washcoat region is substantially free of palladium, particularly substantially free of palladium (Pd) disposed or supported on the first support material. More preferably, the first washcoat region does not comprise palladium, particularly palladium disposed or supported on the first support material. The presence of palladium, particularly in a large amount, in the can be detrimental to HC oxidation activity.

Generally, the first washcoat region comprises platinum (Pt) as the only platinum group metal. The first washcoat region preferably does not comprise one or more other platinum group metals, such as ruthenium (Ru), rhodium (Rh), palladium (Pd), osmium (Os) and/or iridium (Ir). More preferably, the first washcoat region does not comprise one or more other platinum group metals, such as ruthenium (Ru), rhodium (Rh), palladium (Pd), osmium (Os) and/or iridium (Ir), supported on the first support material.

It is intended that the primary function of the first washcoat region is oxidising carbon monoxide (CO) and hydrocarbons (HCs). However, it is appreciated that in some embodiments of the oxidation catalyst, the first washcoat region may also oxidise some nitric oxide (NO) to nitrogen dioxide ($NO_2$) during use, particularly when a significant amount of is platinum present.

The first washcoat region also comprises manganese (Mn). The manganese may be present in an elemental form or as an oxide. The first washcoat region typically comprises manganese or an oxide thereof.

The manganese (Mn) is typically disposed or supported on the first support material. The manganese (Mn) may be disposed directly onto or is directly supported by the first support material (e.g. there is no intervening support material between the Mn and the first support material).

The first washcoat region typically has a total loading of manganese (Mn) of 5 to 500 g ft$^{-3}$. It is preferred that the first washcoat region has a total loading of manganese (Mn) of 10 to 250 g ft$^{-3}$ (e.g. 75 to 175 g ft$^{-3}$), more preferably 15 to 200 g ft$^{-3}$ (e.g. 50 to 150 g ft$^{-3}$), still more preferably 20 to 150 g ft$^{-3}$.

Typically, the first washcoat region comprises a ratio of Mn:Pt by weight of ≤5:1, more preferably <5:1.

In general, the first washcoat region comprises a ratio of Mn:Pt by weight of ≥0.2:1 (e.g. ≥0.5:1), more preferably >0.2:1 (e.g. >0.5:1).

The first washcoat region may comprise a ratio by total weight of manganese (Mn) to platinum of 5:1 to 0.2:1, such as 5:1 to 0.5:1 (e.g. 5:1 to 2:3 or 5:1 to 1:2), preferably 4.5:1 to 1:1 (e.g. 4:1 to 1.1:1), more preferably 4:1 to 1.5:1. The ratio of Mn:Pt by weight can be important in obtaining the activity described herein.

Typically, the first support material comprises, or consists essentially of, a refractory metal oxide. Refractory metal oxides suitable for use as a catalytic component of an oxidation catalyst for a diesel engine are well known in the art.

The refractory metal oxide is typically selected from the group consisting of alumina, silica, titania, zirconia, ceria and a mixed or composite oxide thereof, such as a mixed or composite oxide of two or more thereof. For example, the refractory metal oxide may be selected from the group consisting of alumina, silica, titania, zirconia, ceria, silica-alumina, titania-alumina, zirconia-alumina, ceria-alumina, titania-silica, zirconia-silica, zirconia-titania, ceria-zirconia and alumina-magnesium oxide.

The first support material, or the refractory metal oxide thereof, may optionally be doped (e.g. with a dopant). The dopant may be selected from the group consisting of zirconium (Zr), titanium (Ti), silicon (Si), yttrium (Y), lanthanum (La), praseodymium (Pr), samarium (Sm), neodymium (Nd) and an oxide thereof.

The inclusion of a dopant can thermally stabilise the refractory metal oxide or support material. It is to be understood that any reference to "doped" in this context refers to a material where the bulk or host lattice of the refractory metal oxide is substitution doped or interstitially doped with a dopant. In some instances, small amounts of the dopant may be present at a surface of the refractory metal oxide. However, most of the dopant will generally be present in the body of the refractory metal oxide. The chemical and/or physical properties of a refractory metal oxide are often affected by the presence of a dopant.

When the first support material, or the refractory metal oxide thereof, is doped, the total amount of dopant is 0.25 to 5% by weight, preferably 0.5 to 3% by weight (e.g. about 1% by weight).

It is particularly preferred that the first support material or the refractory metal oxide thereof comprises, or consists essentially of, alumina doped with a dopant.

The alumina may be doped with a dopant comprising silicon (Si), magnesium (Mg), barium (Ba), lanthanum (La), cerium (Ce), titanium (Ti), or zirconium (Zr) or a combination of two or more thereof. The dopant may comprise, or consist essentially of, an oxide of silicon, an oxide of magnesium, an oxide of barium, an oxide of lanthanum, an oxide of cerium, an oxide of titanium or an oxide of zirconium. Preferably, the dopant comprises, or consists essentially of, silicon, magnesium, barium, cerium, or an oxide thereof, particularly silicon, or cerium, or an oxide thereof. More preferably, the dopant comprises, or consists essentially of, silicon, magnesium, barium, or an oxide thereof; particularly silicon, magnesium, or an oxide thereof; especially silicon or an oxide thereof.

Examples of alumina doped with a dopant include alumina doped with silica, alumina doped with magnesium oxide, alumina doped with barium or barium oxide, alumina doped with lanthanum oxide, or alumina doped with ceria, particularly alumina doped with silica, alumina doped with lanthanum oxide, or alumina doped with ceria. It is preferred that the alumina doped with a dopant is alumina doped with silica, alumina doped with barium or barium oxide, or alumina doped with magnesium oxide. More preferably, the alumina doped with a dopant is alumina doped with silica or alumina doped with magnesium oxide. Even more preferably, the alumina doped with a dopant is alumina doped with silica. Alumina doped with a dopant can be prepared using methods known in the art or, for example, by a method described in U.S. Pat. No. 5,045,519.

When the alumina is alumina doped with silica, then the alumina is doped with silica in a total amount of 0.5 to 45% by weight (i.e. % by weight of the alumina), preferably 1 to 40% by weight, more preferably 1.5 to 30% by weight (e.g. 1.5 to 10% by weight), particularly 2.5 to 25% by weight, more particularly 3.5 to 20% by weight (e.g. 5 to 20% by weight), even more preferably 4.5 to 15% by weight.

When the alumina is alumina doped with magnesium oxide, then the alumina is doped with magnesium in an amount as defined above or an amount of 1 to 30% by weight (i.e. % by weight of the alumina), preferably 5 to 25% by weight.

It is preferred that the first support material, or the refractory metal oxide thereof, is not doped with a dopant comprising, or consisting essentially of manganese. Thus, the first support material, or the refractory metal oxide thereof, is not promoted with a promoter, such as a promoter selected from the group consisting of tin, manganese, indium, group VIII metal (e.g. Fe, Co, Ni, Ru, Rh, Pd, Os, Ir and Pt, particularly Ir) and combinations thereof.

Alternatively or additionally, the first support material, or refractory metal oxide thereof, may comprise, or consist essentially of, an alkaline earth metal aluminate. The term "alkaline earth metal aluminate" generally refers to a compound of the formula $MAl_2O_4$ where "M" represents the alkaline earth metal, such as Mg, Ca, Sr or Ba. Such compounds generally comprise a spinel structure. These compounds can be prepared using conventional methods known in the art or by using a method described in EP 0945165, U.S. Pat. No. 6,217,837 or U.S. Pat. No. 6,517,795.

Typically, the alkaline earth metal aluminate is magnesium aluminate ($MgAl_2O_4$), calcium aluminate ($CaAl_2O_4$), strontium aluminate ($SrAl_2O_4$), barium aluminate ($BaAl_2O_4$), or a mixture of two or more thereof. Preferably, the alkaline earth metal aluminate is magnesium aluminate ($MgAl_2O_4$).

In general, when the first support material, or the refractory metal oxide thereof, comprises or consists essentially of a mixed or composite oxide of alumina (e.g. silica-alumina, alumina-magnesium oxide or a mixture of alumina and ceria), then preferably the mixed or composite oxide of alumina comprises at least 50 to 99% by weight of alumina, more preferably 70 to 95% by weight of alumina, even more preferably 75 to 90% by weight of alumina.

When the first support material, or refractory metal oxide thereof, comprises or consists essentially of ceria-zirconia, then the ceria-zirconia may consist essentially of 20 to 95% by weight of ceria and 5 to 80% by weight of zirconia (e.g. 50 to 95% by weight ceria and 5 to 50% by weight zirconia), preferably 35 to 80% by weight of ceria and 20 to 65% by weight zirconia (e.g. 55 to 80% by weight ceria and 20 to 45% by weight zirconia), even more preferably 45 to 75% by weight of ceria and 25 to 55% by weight zirconia.

The first washcoat region may comprise an amount of first support material of 0.1 to 4.5 g in$^{-3}$ (e.g. 0.25 to 4.2 g in$^{-3}$), preferably 0.3 to 3.8 g in$^{-3}$, still more preferably 0.5 to 3.0 g in$^{-3}$ (1 to 2.75 g in$^{-3}$ or 0.75 to 1.5 g in$^{-3}$), and even more preferably 0.6 to 2.5 g in$^{-3}$ (e.g. 0.75 to 2.3 g in$^{-3}$).

The first washcoat region may further comprise a hydrocarbon adsorbent material. The hydrocarbon adsorbent material may be a zeolite.

It is preferred that the zeolite is a medium pore zeolite (e.g. a zeolite having a maximum ring size of ten tetrahedral atoms) or a large pore zeolite (e.g. a zeolite having a maximum ring size of twelve tetrahedral atoms). It may be preferable that the zeolite is not a small pore zeolite (e.g. a zeolite having a maximum ring size of eight tetrahedral atoms).

Examples of suitable zeolites or types of zeolite include faujasite, clinoptilolite, mordenite, silicalite, ferrierite, zeolite X, zeolite Y, ultrastable zeolite Y, AEI zeolite, ZSM-5 zeolite, ZSM-12 zeolite, ZSM-20 zeolite, ZSM-34 zeolite, CHA zeolite, SSZ-3 zeolite, SAPO-5 zeolite, offretite, a beta zeolite or a copper CHA zeolite. The zeolite is preferably ZSM-5, a beta zeolite or a Y zeolite.

When the first washcoat region comprises a hydrocarbon adsorbent, the total amount of hydrocarbon adsorbent is 0.05 to 3.00 g in$^{-3}$, particularly 0.10 to 2.00 g in$^{-3}$, more particularly 0.2 to 1.0 g in$^{-3}$. For example, the total amount of hydrocarbon adsorbent may be 0.8 to 1.75 g in$^{-3}$, such as 1.0 to 1.5 g in$^{-3}$.

However, it may be preferable that the first washcoat region does not comprise a hydrocarbon adsorbent material.

The first washcoat region may further comprise a zeolite catalyst, such as a zeolite catalyst as herein defined below. It is preferred that the first washcoat region comprises a zeolite catalyst when the second washcoat region comprises a zeolite catalyst. Thus, the first washcoat region and the second washcoat region each comprise a zeolite catalyst.

Alternatively, the first washcoat region is substantially free of a zeolite catalyst, such as the zeolite catalyst described herein below. Thus, the first washcoat region may not comprise the zeolite catalyst.

It may, however, be preferable that the first washcoat region does not comprise rhodium, an alkali metal and/or an alkaline earth metal, particularly an alkali metal and/or an alkaline earth metal disposed or supported on a support material (e.g. the first support material, the platinum support material and/or the palladium support material). Thus, the first washcoat region may not comprise rhodium, an alkali metal and/or an alkaline earth metal, particularly an alkali metal and/or alkaline earth metal disposed or supported on a support material.

The first washcoat region typically does not comprise indium and/or iridium. More preferably, the second washcoat region does not comprise indium, iridium and/or magnesium.

It may be preferable that the first washcoat region does not comprise cerium oxide or a mixed or composite oxide thereof, such as (i) a mixed or composite oxide of cerium oxide and alumina and/or (ii) a mixed or composite oxide of cerium oxide and zirconia.

Additionally or alternatively, the first washcoat region may be substantially free of rhodium, an alkali metal and/or an alkaline earth metal, particularly an alkali metal and/or an alkaline earth metal disposed or supported on the first support material. Thus, the first washcoat may not comprise rhodium, an alkali metal and/or an alkaline earth metal, particularly an alkali metal and/or an alkaline earth metal disposed or supported on the first support material.

The oxidation catalyst of the invention comprises a second washcoat region. It is preferred that the second washcoat region is suitable for oxidising nitric oxide (NO) to nitrogen dioxide ($NO_2$).

The second washcoat region comprises a platinum group metal (PGM).

Typically, the PGM is selected from the group consisting of platinum, palladium and a combination of platinum and palladium. The PGM may be platinum. The PGM may consist essentially of platinum (e.g. the PGM is platinum only). The PGM may be palladium. The PGM may consist essentially of palladium (e.g. the PGM is palladium only). The PGM may be a combination of platinum and palladium. The PGM may consist essentially of platinum and palladium (e.g. the PGM is platinum and palladium only). It is preferred that the PGM is selected from the group consisting of platinum and a combination of platinum and palladium.

The second washcoat region may comprise the PGM as the only platinum group metal(s). Thus, the only PGM(s) present in the second washcoat region is/are defined by the PGM.

When the PGM is a combination of platinum and palladium, then the PGM may be in the form of an alloy, preferably a bimetallic alloy. Thus, the PGM may comprise, or consist essentially of, an alloy of platinum and palladium.

When the PGM is palladium or a combination of platinum and palladium, then the second washcoat region may further comprise gold. The second washcoat region may comprise a palladium-gold alloy (e.g. the palladium of the first platinum group metal may be present as an alloy with gold). Catalysts comprising gold (Au) can be prepared using the method described in WO 2012/120292.

When the second washcoat region comprises gold, such as a palladium-gold alloy, then generally the second washcoat region comprises a ratio of the total mass of palladium (Pd) to the total mass of gold (Au) of 9:1 to 1:9, preferably 5:1 to 1:5, and more preferably 2:1 to 1:2.

The second washcoat region typically has a total loading of the PGM of 5 to 300 g ft$^{-3}$. It is preferred that the second washcoat region has a total loading of the PGM of 10 to 250 g ft$^{-3}$ (e.g. 75 to 175 g ft$^{-3}$), more preferably 15 to 200 g ft$^{-3}$ (e.g. 50 to 150 g ft$^{-3}$), still more preferably 20 to 150 g ft$^{-3}$.

When the PGM is a combination of platinum and palladium, then typically the second washcoat region comprises a ratio by weight of platinum to palladium of 20:1 to 1:20 (e.g. 15:1 to 1:15), preferably 10:1 to 1:10 (e.g. 7.5:1 to 1:7.5), more preferably 5:1 to 1:5 (e.g. 3:1 to 1:3), and even more preferably 2.5:1 to 1:1.

It is preferred that when the PGM is a combination of platinum and palladium then the second washcoat region comprises a total weight of platinum that is greater than or equal to the total weight of palladium (e.g. the ratio of Pt:Pd by weight is ≥1:1). More preferably, the second washcoat region comprises a total weight of platinum that is greater than the total weight of palladium (e.g. the ratio of Pt:Pd by weight is >1:1). Advantageous NO oxidation activity can be obtained when the second washcoat region is platinum rich.

It is generally preferred that the second washcoat region comprises a ratio by weight of platinum to palladium of 20:1 to 1:1 (e.g. 15.1:1 to 1.1:1), more preferably 10:1 to 1.25:1 (e.g. 7.5:1 to 1.5:1), and still more preferably 5:1 to 2:1.

Typically, the PGM is disposed or supported on the second support material. The PGM may be disposed directly onto or is directly supported by the second support material (e.g. there is no intervening support material between the PGM and the second support material). For example, platinum and/or palladium can be dispersed on the second support material.

Typically, the second support material comprises, or consists essentially of, a refractory metal oxide. The refractory metal oxide is typically selected from the group consisting of alumina, silica, titania, zirconia, ceria and a mixed or composite oxide thereof, such as a mixed or composite oxide of two or more thereof. For example, the refractory metal oxide may be selected from the group consisting of alumina, silica, titania, zirconia, ceria, silica-alumina, titania-alumina, zirconia-alumina, ceria-alumina, titania-silica, zirconia-silica, zirconia-titania, ceria-zirconia and alumina-magnesium oxide.

The second support material, or the refractory metal oxide thereof, may optionally be doped (e.g. with a dopant). The dopant may be selected from the group consisting of zirconium (Zr), titanium (Ti), silicon (Si), yttrium (Y), lanthanum (La), praseodymium (Pr), samarium (Sm), neodymium (Nd) and an oxide thereof.

When the second support material, or the refractory metal oxide thereof, is doped, the total amount of dopant is 0.25 to 5% by weight, preferably 0.5 to 3% by weight (e.g. about 1% by weight).

The second support material, or the refractory metal oxide thereof, may comprise, or consist essentially of, alumina doped with a dopant. It is particularly preferred that the second support material, or the refractory metal oxide thereof, comprises, or consists essentially of, alumina doped with a dopant. It has been found that the combination of manganese (Mn), platinum (Pt) and a doped alumina support material, particularly an alumina support material doped with silica, provides excellent NO oxidation activity and can stabilise NO oxidation activity of the oxidation catalyst over its lifetime.

The alumina may be doped with a dopant comprising silicon (Si), magnesium (Mg), barium (Ba), lanthanum (La), cerium (Ce), titanium (Ti), or zirconium (Zr) or a combination of two or more thereof. The dopant may comprise, or consist essentially of, an oxide of silicon, an oxide of magnesium, an oxide of barium, an oxide of lanthanum, an oxide of cerium, an oxide of titanium or an oxide of zirconium. Preferably, the dopant comprises, or consists essentially of, silicon, magnesium, barium, cerium, or an oxide thereof; particularly silicon, cerium, or an oxide thereof. More preferably, the dopant comprises, or consists essentially of, silicon, magnesium, barium, or an oxide thereof; particularly silicon, magnesium, or an oxide thereof; especially silicon or an oxide thereof.

In general, when the second support material, or the refractory metal oxide thereof, comprises or consists essentially of a mixed or composite oxide of alumina (e.g. silica-alumina, alumina-magnesium oxide or a mixture of alumina and ceria), then preferably the mixed or composite oxide of alumina comprises at least 50 to 99% by weight of alumina, more preferably 70 to 95% by weight of alumina, even more preferably 75 to 90% by weight of alumina.

Examples of alumina doped with a dopant include alumina doped with silica, alumina doped with magnesium oxide, alumina doped with barium or barium oxide, alumina doped with lanthanum oxide, or alumina doped with ceria, particularly alumina doped with silica, alumina doped with lanthanum oxide, or alumina doped with ceria. It is preferred that the alumina doped with a dopant is alumina doped with silica, alumina doped with barium or barium oxide, or alumina doped with magnesium oxide. More preferably, the alumina doped with a dopant is alumina doped with silica or alumina doped with magnesium oxide. Even more preferably, the alumina doped with a dopant is alumina doped with silica.

When the alumina is alumina doped with silica, then the alumina is doped with silica in a total amount of 0.5 to 45% by weight (i.e. % by weight of the alumina), preferably 1 to 40% by weight, more preferably 1.5 to 30% by weight (e.g. 1.5 to 10% by weight), particularly 2.5 to 25% by weight, more particularly 3.5 to 20% by weight (e.g. 5 to 20% by weight), even more preferably 4.5 to 15% by weight.

When the alumina is alumina doped with magnesium oxide, then the alumina is doped with magnesium in an amount as defined above or an amount of 1 to 30% by weight (i.e. % by weight of the alumina), preferably 5 to 25% by weight.

When the second support material, or refractory metal oxide thereof, comprises or consists essentially of ceria-zirconia, then the ceria-zirconia may consist essentially of 20 to 95% by weight of ceria and 5 to 80% by weight of zirconia (e.g. 50 to 95% by weight ceria and 5 to 50% by weight zirconia), preferably 35 to 80% by weight of ceria and 20 to 65% by weight zirconia (e.g. 55 to 80% by weight ceria and 20 to 45% by weight zirconia), even more preferably 45 to 75% by weight of ceria and 25 to 55% by weight zirconia.

Alternatively or additionally, the second support material, or refractory metal oxide thereof, may comprise, or consist essentially of, an alkaline earth metal aluminate, such as an alkaline earth metal aluminate having a spinel structure.

Typically, the alkaline earth metal aluminate is magnesium aluminate ($MgAl_2O_4$), calcium aluminate ($CaAl_2O_4$), strontium aluminate ($SrAl_2O_4$), or barium aluminate ($BaAl_2O_4$), or a mixture of two or more thereof. Preferably, the alkaline earth metal aluminate is magnesium aluminate ($MgAl_2O_4$).

The second washcoat region typically comprises an amount of the second support material of 0.1 to 4.5 g in$^{-3}$ (e.g. 0.25 to 4.0 g in$^{-3}$), preferably 0.5 to 3.0 g in$^{-3}$, more preferably 0.6 to 2.5 g in$^{-3}$ (e.g. 0.75 to 1.5 g in$^{-3}$).

In general, the first washcoat region and the second washcoat region have different compositions (i.e. different components and/or different amounts of components).

In a first embodiment of the second washcoat region, the second washcoat region comprises manganese (Mn). The manganese may be present in an elemental form or as an oxide. The second washcoat region typically comprises manganese or an oxide thereof.

The manganese (Mn) is typically disposed or supported on the second support material. The manganese (Mn) may be disposed directly onto or is directly supported by the second support material (e.g. there is no intervening support material between the Mn and the second support material).

The second washcoat region typically has a total loading of manganese (Mn) of 5 to 500 g ft$^{-3}$. It is preferred that the second washcoat region has a total loading of manganese (Mn) of 10 to 250 g ft$^{-3}$ (e.g. 75 to 175 g ft$^{-3}$), more preferably 15 to 200 g ft$^{-3}$ (e.g. 50 to 150 g ft$^{-3}$), still more preferably 20 to 150 g ft$^{-3}$.

When the second washcoat region comprises manganese (Mn), then the PGM comprises platinum (e.g. the PGM is selected from the group consisting of platinum and a combination of platinum and palladium). It has been found that a second washcoat region comprising Mn can provide good NO oxidation, particularly when combined with the first washcoat region, which oxidises CO, HCs and some NO.

Typically, the second washcoat region comprises a ratio of Mn:Pt by weight of ≤5:1, more preferably <5:1.

In general, the second washcoat region comprises a ratio of Mn:Pt by weight of ≥0.2:1 (e.g. ≥0.5:1), more preferably >0.2:1 (e.g. >0.5:1).

The second washcoat region may comprise a ratio by total weight of manganese (Mn) to platinum of 5:1 to 0.2:1, such as 5:1 to 0.5:1 (e.g. 5:1 to 2:3 or 5:1 to 1:2), preferably 4.5:1 to 1:1 (e.g. 4:1 to 1.1:1), more preferably 4:1 to 1.5:1. The ratio of Mn:Pt by weight can be important in obtaining the activity toward NO described herein.

The platinum (Pt) is typically disposed or supported on the second support material. The platinum may be disposed directly onto or is directly supported by the second support material (e.g. there is no intervening support material between the platinum and the second support material). For example, platinum can be dispersed on the second support material.

The second washcoat region typically has a total loading of platinum of 5 to 300 g ft$^{-3}$. It is preferred that the second washcoat region has a total loading of platinum of 10 to 250 g ft$^{-3}$ (e.g. 75 to 175 g ft$^{-3}$), more preferably 15 to 200 g ft$^{-3}$ (e.g. 50 to 150 g ft$^{-3}$), still more preferably 20 to 150 g ft$^{-3}$.

The second washcoat region may further comprise palladium (e.g. the PGM is a combination of platinum and palladium). The palladium may be disposed or supported on the second support material.

When the second washcoat region comprises palladium, then the ratio of platinum to palladium by total weight is generally ≥2:1 (e.g. Pt:Pd 1:0 to 2:1), more preferably ≥4:1 (e.g. Pt:Pd 1:0 to 4:1).

It is generally preferred that the second washcoat region is substantially free of palladium, particularly substantially free of palladium (Pd) disposed or supported on the second support material. More preferably, the second washcoat region does not comprise palladium, particularly palladium disposed or supported on the second support material. The presence of palladium, particularly in a large amount, in the second washcoat region can be detrimental to NO oxidation activity. The NO oxidising activity of palladium is generally poor under the typical usage conditions for a diesel oxidation catalyst. Also, any palladium that is present may react with some of the platinum that is present to form an alloy. This can also be detrimental to the NO oxidation activity of the second washcoat region because platinum-palladium alloys are not as active toward NO oxidation as platinum is by itself.

Generally, the second washcoat region comprises platinum (Pt) as the only platinum group metal. The second washcoat region preferably does not comprise one or more other platinum group metals, such as ruthenium (Ru), rhodium (Rh), palladium (Pd), osmium (Os) and/or iridium (Ir). More preferably, the second washcoat region does not comprise one or more other platinum group metals, such as ruthenium (Ru), rhodium (Rh), palladium (Pd), osmium (Os) and/or iridium (Ir), supported on the second support material.

In a second embodiment of the second washcoat region, the second washcoat region comprises a zeolite catalyst, such as a zeolite catalyst as herein defined below.

When the second washcoat region comprises a zeolite catalyst, then the second washcoat region may comprise a ratio by total weight of platinum to the palladium supported on the second support material is ≥2:1 (e.g. Pt:Pd 1:0 to 2:1), more preferably ≥4:1 (e.g. Pt:Pd 1:0 to 4:1).

Generally, the zeolite catalyst comprises, or consists essentially of, a noble metal and a zeolite. Zeolite catalysts can be prepared according to the method described in WO 2012/166868.

The noble metal is typically selected from the group consisting of palladium (Pd), platinum (Pt), rhodium (Rh), gold (Au), silver (Ag), iridium (Ir), ruthenium (Ru), osmium (Os) and mixtures of two or more thereof. Preferably, the noble metal is selected from the group consisting of palladium (Pd), platinum (Pt), rhodium (Rh), gold (Au), silver (Ag), iridium (Ir), ruthenium (Ru) and mixtures of two or more thereof. More preferably, the noble metal is selected from the group consisting of palladium (Pd), platinum (Pt) and rhodium (Rh). Even more preferably, the noble metal is palladium (Pd). It is further preferred that the zeolite catalyst comprises palladium as the only noble metal.

The zeolite catalyst may further comprise a base metal. Thus, the zeolite catalyst may comprise, or consist essentially of, a noble metal, a zeolite and optionally a base metal.

The base metal may be selected from the group consisting of iron (Fe), copper (Cu), manganese (Mn), chromium (Cr), cobalt (Co), nickel (Ni), and tin (Sn), as well as mixtures of two or more thereof. It is preferred that the base metal is selected from the group consisting of iron, copper and cobalt, more preferably iron and copper. Even more preferably, the base metal is iron.

Alternatively, the zeolite catalyst may be substantially free of a base metal. Thus, the zeolite catalyst does not comprise a base metal.

In general, it is preferred that the zeolite catalyst does not comprise a base metal.

The zeolite is typically selected from an aluminosilicate zeolite and an aluminophosphate zeolite.

In general, the zeolite may be a metal-substituted zeolite (e.g. metal-substituted aluminosilicate zeolite or metal-substituted aluminophosphate zeolite). The metal of the metal-substituted zeolite may be the noble metal (e.g. the zeolite is a noble metal substituted zeolite). When the zeolite catalyst comprises a base metal, then the zeolite may be a noble and base metal-substituted zeolite.

The zeolite catalyst generally has at least 1% by weight (i.e. of the amount of noble metal of the zeolite catalyst) of the noble metal located inside pores of the zeolite, preferably at least 5% by weight, more preferably at least 10% by weight, such as at least 25% by weight, even more preferably at least 50% by weight.

The zeolite may be selected from a small pore zeolite (i.e. a zeolite having a maximum ring size of eight tetrahedral atoms), a medium pore zeolite (i.e. a zeolite having a maximum ring size of ten tetrahedral atoms) and a large pore zeolite (i.e. a zeolite having a maximum ring size of twelve tetrahedral atoms). More preferably, the zeolite is selected from a small pore zeolite and a medium pore zeolite.

Typically, the zeolite is composed of aluminium, silicon, and/or phosphorus. The zeolite generally has a three-dimensional arrangement of $SiO_4$, $AlO_4$, and/or $PO_4$ that are joined by the sharing of oxygen atoms. The zeolite may have an anionic framework. The charge of the anionic framework may be counterbalanced by cations, such as by cations of alkali and/or alkaline earth elements (e.g., Na, K, Mg, Ca, Sr, and Ba), ammonium cations and/or protons.

In a first zeolite catalyst embodiment, the zeolite is a small pore zeolite. The small pore zeolite preferably has a Framework Type selected from the group consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG and ZON, as well as a mixture or intergrowth of any two or more thereof. The intergrowth is preferably selected from KFI-SIV, ITE-RTH, AEW-UEI, AEI-CHA, and AEI-SAV. More preferably, the small pore zeolite has a Framework Type that is AEI, CHA or an AEI-CHA intergrowth. Even more preferably, the small pore zeolite has a Framework Type that is AEI or CHA.

In a second zeolite catalyst embodiment, the zeolite has a Framework Type selected from the group consisting of AEI, MFI, EMT, ERI, MOR, FER, BEA, FAU, CHA, LEV, MWW, CON and EUO, as well as mixtures of any two or more thereof.

In a third zeolite catalyst embodiment, the zeolite is a medium pore zeolite. The medium pore zeolite preferably has a Framework Type selected from the group consisting of MFI, FER, MWW and EUO, more preferably MFI.

In a fourth zeolite catalyst embodiment, the zeolite is a large pore zeolite. The large pore zeolite preferably has a Framework Type selected from the group consisting of CON, BEA, FAU, MOR and EMT, more preferably BEA.

The zeolite typically has a silica to alumina molar ratio (SAR) of 10 to 200 (e.g. 10 to 40), more preferably 15 to 80 (e.g. 15 to 30).

The zeolite catalyst of the first, third and fourth zeolite catalyst embodiments (and also for some of the Framework Types of the second zeolite catalyst embodiment) may have an infrared spectrum having a characteristic absorption peak in a range of from 750 $cm^{-1}$ to 1050 $cm^{-1}$ (in addition to the absorption peaks for the zeolite itself). Preferably, the characteristic absorption peak is in the range of from 800 $cm^{-1}$ to 1000 $cm^{-1}$, more preferably in the range of from 850 $cm^{-1}$ to 975 $cm^{-1}$.

In the second embodiment of the second washcoat region, the second washcoat region may be substantially free of manganese or an oxide thereof. The second washcoat region preferably does not comprise manganese or an oxide thereof.

It has surprisingly been found that a washcoat region comprising the zeolite catalyst of the first zeolite catalyst embodiment has passive NO adsorber (PNA) activity. A washcoat region with PNA activity can be used to store NO when exhaust gas temperatures are relatively cool, such as shortly after start-up of a diesel engine. NO storage by the zeolite catalyst occurs at temperatures (e.g. less than 200° C.) that are lower than the temperature at which the platinum and manganese components of the first washcoat region perform significant oxidation of nitric oxide (NO) to nitrogen dioxide ($NO_2$).

As the diesel engine warms up, the exhaust gas temperature increases and the temperature of the zeolite catalyst (and the washcoat region having PNA activity) will also increase. The zeolite catalyst will release adsorbed NO at these higher temperatures (e.g. 200° C. or above). The zeolite catalyst can release adsorbed NO when the platinum and manganese components of the second washcoat region have reached their effective temperature for oxidising NO or the zeolite catalyst can release adsorbed NO at just below this effective temperature. The zeolite catalyst has unexpectedly been found to have a high release temperature for adsorbed $NO_x$. It has also been unexpectedly found that a washcoat region comprising the zeolite catalyst of the second zeolite catalyst embodiment has cold start catalyst (CSC™) activity. Such activity can reduce emissions during the cold start period by adsorbing $NO_x$ and hydrocarbons (HCs) at relatively low exhaust gas temperatures (e.g. less than 200° C.). Adsorbed NO and/or HCs can be released by the washcoat region when the temperature of the zeolite catalyst is close to or above the effective temperature of the other catalyst components for oxidising NO and/or HCs. The cold start catalyst activity of the zeolite catalyst is particularly beneficial when it is combined with the manganese-containing first washcoat region.

It is generally preferred (including the first and second embodiments of the second washcoat region) that the second support material, or the refractory metal oxide thereof, is not doped with a dopant comprising, or consisting essentially of manganese. Thus, the second support material, or the refractory metal oxide thereof, is not promoted with a promoter, such as a promoter selected from the group consisting of tin, manganese, indium, group VIII metal (e.g. Fe, Co, Ni, Ru, Rh, Pd, Os, Ir and Pt, particularly Ir) and combinations thereof.

In some applications, it may generally be preferable that the second washcoat region is substantially free of a hydrocarbon adsorbent material, particularly a zeolite. Thus, the second washcoat region may not comprise a hydrocarbon adsorbent material.

It may be further preferable that the second washcoat region is substantially free of a zeolite catalyst, such as the zeolite catalyst described herein above. Thus, the second washcoat region may not comprise the zeolite catalyst.

The second washcoat region typically does not comprise indium and/or iridium. More preferably, the second washcoat region does not comprise indium, iridium and/or magnesium.

It may be preferable that the second washcoat region does not comprise cerium oxide or a mixed or composite oxide thereof, such as (i) a mixed or composite oxide of cerium oxide and alumina and/or (ii) a mixed or composite oxide of cerium oxide and zirconia.

Additionally or alternatively, the second washcoat region may be substantially free of rhodium, an alkali metal and/or an alkaline earth metal, particularly an alkali metal and/or an alkaline earth metal disposed or supported on the second support material. Thus, the second washcoat may not comprise rhodium, an alkali metal and/or an alkaline earth metal, particularly an alkali metal and/or an alkaline earth metal disposed or supported on the second support material.

Typically, the first washcoat region comprises >25% of the total concentration of platinum group metal (i.e. of the oxidation catalyst). It is preferred that the first washcoat region comprises >30%, more preferably ≥40%, of the total concentration of platinum group metal.

In general, the total concentration of platinum in the first washcoat region is greater than the total concentration of PGM in the second washcoat region.

Typically, the oxidation catalyst comprises a total amount of support material (e.g. the first support material and the second support) of 0.1 to 4.5 g $in^{-3}$ (e.g. 0.25 to 4.2 g $in^{-3}$), preferably 0.2 to 3.8 g $in^{-3}$, such as 0.3 to 3.0 g $in^{-3}$, particularly 0.5 to 2.5 g $in^{-3}$ (e.g. 0.75 to 2.3 g $in^{-3}$), still more preferably 0.6 to 2.0 g $in^{-3}$, and even more preferably 0.75 to 1.75 g $in^{-3}$.

The first washcoat region and/or the second washcoat region may be disposed or supported on the substrate.

The first washcoat region may be disposed directly on to the substrate (i.e. the first washcoat region is in contact with a surface of the substrate; see FIGS. 1 to 5). The second washcoat region may be:

(a) disposed or supported on the first washcoat region (e.g. see FIGS. 2, 4 and 5); and/or
(b) disposed directly on to the substrate [i.e. the second washcoat region is in contact with a surface of the substrate] (e.g. see FIGS. 1, 3, 4); and/or
(c) in contact with the first washcoat region [i.e. the second washcoat region is adjacent to, or abuts, the first washcoat region].

When the second washcoat region is disposed directly on to the substrate, then a part or portion of the second washcoat region may be in contact with the first washcoat region or the first washcoat region and the second washcoat region may be separated (e.g. by a gap).

When the second washcoat region is disposed or supported on the first washcoat region, all or part of the second washcoat region is preferably disposed directly on to the first washcoat region (i.e. the second washcoat region is in contact with a surface of the first washcoat region). The second washcoat region may be a second washcoat layer and the first washcoat region may be a first washcoat layer.

Figure 1:
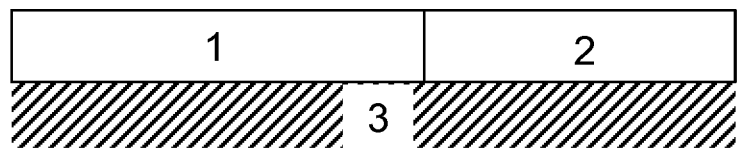
FIGS. 1 to 10 are schematic representations of oxidation catalysts of the invention. In the Figures, the left hand side of the oxidation catalyst is the inlet end and the right hand side is the outlet end.
Figure 2:
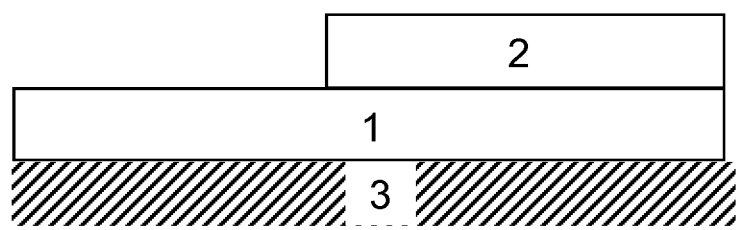
Figure 3:
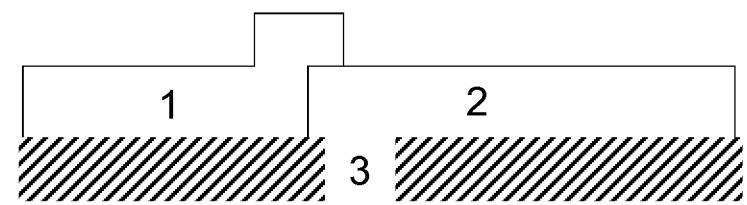
Figure 4:
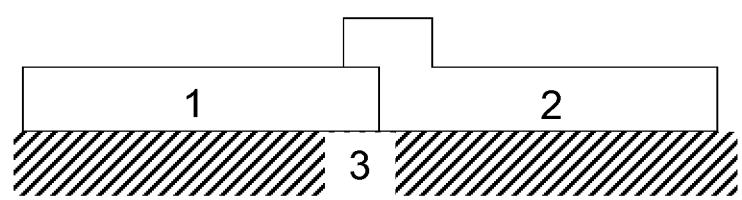

The second washcoat region may be disposed directly on to the substrate (i.e. the second washcoat region is in contact with a surface of the substrate; see FIGS. 1, 3 and 4). The first washcoat region may be:

(i) disposed or supported on the second washcoat region (e.g. see FIGS. 3 and 4); and/or
(ii) disposed directly on to the substrate [i.e. the first washcoat region is in contact with a surface of the substrate] (e.g. see FIGS. 3 and 4); and/or
(iii) in contact with the second washcoat region [i.e. the first washcoat region is adjacent to, or abuts, the second washcoat region].

The first washcoat region may be disposed directly on to the second washcoat region (i.e. the first washcoat region is in contact with a surface of the second washcoat region).

It is preferred that only a portion or part of the first washcoat region is disposed or supported on the second washcoat region. Thus, the first washcoat region does not completely overlap or cover the second washcoat region.

In general, it is possible that both the first washcoat region and the second washcoat region are not directly disposed on the substrate (i.e. neither the first washcoat region nor the second washcoat region is in contact with a surface of the substrate).

In the oxidation catalyst of the invention, the second washcoat region is generally arranged to contact the exhaust gas at the outlet end of the substrate. This is achieved by disposing the second washcoat region/layer/zone at an outlet end of the substrate.

The second washcoat region is typically arranged or oriented to contact exhaust gas after it has contacted the first washcoat region. This may be achieved by arranging the second washcoat region in various ways on the substrate in relation to the first washcoat region.

Thus, the second washcoat region is arranged or oriented to contact exhaust after it has contacted the first washcoat region when:

(a) the second washcoat region is a second washcoat zone disposed at an outlet end of the substrate and optionally the first washcoat region is a first washcoat zone disposed at an inlet end of the substrate;
(b) the first washcoat region is a first washcoat layer and the second washcoat region is a second washcoat zone, wherein the second washcoat zone is disposed on the first washcoat layer at an outlet end of the substrate; or
(c) the first washcoat region is a first washcoat layer and the second washcoat region is a second washcoat layer, and wherein the second washcoat layer is disposed on the first washcoat layer.

Typically, the first washcoat region is arranged or oriented to contact exhaust gas before the second washcoat region. Thus, the first washcoat region may be arranged to contact exhaust gas as it enters the oxidation catalyst and the second washcoat region may be arranged to contact the exhaust gas as it leaves the oxidation catalyst. The zoned arrangement of the first and second washcoat regions shown in FIGS. 1 and 6 to 10 are particularly advantageous in this respect.

The second washcoat region is arranged to contact the exhaust gas at the outlet end of the substrate and after contact of the exhaust gas with the first washcoat region in any one of the first to third oxidation catalyst arrangements described herein below.

It is preferred that the second washcoat region is a second washcoat zone. More preferably, the second washcoat zone is disposed or supported at or near an outlet end of the substrate.

The second washcoat zone typically has a length of 10 to 90% of the length of the substrate (e.g. 10 to 45%), preferably 15 to 75% of the length of the substrate (e.g. 15 to 40%), more preferably 20 to 70% (e.g. 30 to 65%, such as 25 to 45%) of the length of the substrate, still more preferably 25 to 65% (e.g. 35 to 50%).

In a first oxidation catalyst arrangement, the first washcoat region is disposed or supported upstream of the second washcoat zone. Preferably, the first washcoat region is a first washcoat zone. More preferably, the first washcoat zone is disposed or supported at or near an inlet end of the substrate.

Typically, the first washcoat zone has a length of 10 to 90% of the length of the substrate (e.g. 10 to 45%), preferably 15 to 75% of the length of the substrate (e.g. 15 to 40%), more preferably 20 to 70% (e.g. 30 to 65%, such as 25 to 45%) of the length of the substrate, still more preferably 25 to 65% (e.g. 35 to 50%). It is preferred that the length of the first washcoat zone is greater than the length of the second washcoat zone.

The first washcoat zone may adjoin the second washcoat zone. Preferably, the first washcoat zone is contact with the second washcoat zone. When the first washcoat zone adjoins the second washcoat zone or the first washcoat zone is in contact with the second washcoat zone, then the first washcoat zone and the second washcoat zone may be disposed or supported on the substrate as a layer (e.g. a single layer). Thus, a layer (e.g. a single) may be formed on the substrate when the first and second washcoat zones adjoin or are in contact with one another. Such an arrangement may avoid problems with back pressure.

The first washcoat zone may be separate from the second washcoat zone. There may be a gap (e.g. a space) between the first washcoat zone and the second washcoat zone.

The first washcoat zone may overlap the second washcoat zone. Thus, an end portion or part of the first washcoat zone may be disposed or supported on the second washcoat zone. The first washcoat zone may completely or partly overlap the second washcoat zone. When the first washcoat zone overlaps the second washcoat zone, it is preferred that first washcoat zone only partly overlaps the second washcoat zone (i.e. the top, outermost surface of the second washcoat zone is not completely covered by the first washcoat zone).

Alternatively, the second washcoat zone may overlap the first washcoat zone. Thus, an end portion or part of the second washcoat zone may be disposed or supported on the first washcoat zone. The second washcoat zone generally only partly overlaps the first washcoat zone.

It is preferred that the first washcoat zone and the second washcoat zone do not substantially overlap.

In a second oxidation catalyst arrangement, the first washcoat region is a first washcoat layer. It is preferred that the first washcoat layer extends for an entire length (i.e. substantially an entire length) of the substrate, particularly the entire length of the channels of a substrate monolith.

The second washcoat zone is typically disposed or supported on the first washcoat layer. Preferably the second washcoat zone is disposed directly on to the first washcoat layer (i.e. the second washcoat zone is in contact with a surface of the first washcoat layer).

When the second washcoat zone is disposed or supported on the first washcoat layer, it is preferred that the entire length of the second washcoat zone is disposed or supported on the first washcoat layer. The length of the second washcoat zone is less than the length of the first washcoat layer.

In a third oxidation catalyst arrangement, the first washcoat region is a first washcoat layer. It is preferred that the first washcoat layer extends for an entire length (i.e. substantially an entire length) of the substrate, particularly the entire length of the channels of a substrate monolith.

The second washcoat region is a second washcoat layer. It is preferred that the second washcoat layer extends for an entire length (i.e. substantially an entire length) of the substrate, particularly the entire length of the channels of a substrate monolith.

The second washcoat layer is disposed or supported on the first washcoat layer. Preferably the second washcoat layer is disposed directly on to the first washcoat layer (i.e. the second washcoat layer is in contact with a surface of the first washcoat layer).

When the second washcoat layer is disposed on the first washcoat layer, particularly when the second washcoat layer does not comprise manganese, the Mn-containing washcoat region is surprisingly tolerant to poisoning by sulfur from diesel fuel.

The oxidation catalyst may further comprise a third washcoat region. Thus, at least one of the first washcoat region and the second washcoat region may be disposed or supported on a third washcoat region. The third washcoat region may or may not comprise a platinum group metal.

The third washcoat region may be disposed directly on to the substrate (i.e. the third washcoat region is in contact with a surface of the substrate; see FIGS. 6, 8 and 10). The second washcoat region may be:

(a) disposed or supported on the third washcoat region (e.g. see FIGS. 6, 8 and 10); and/or
(b) disposed directly on to the substrate [i.e. the second washcoat region is in contact with a surface of the substrate]; and/or
(c) in contact with the third washcoat region [i.e. the second washcoat region is adjacent to, or abuts, the third washcoat region].

Additionally or alternatively, the third washcoat region may be disposed or supported on the first washcoat region and/or the second washcoat region (e.g. see FIGS. 7 and 9).

When the third washcoat region is disposed directly on to the substrate, then the first washcoat region may be disposed or supported on the third washcoat region (e.g. see FIG. 6). The second washcoat region may also be disposed or supported on the third washcoat region. The third washcoat region may be a third washcoat layer, the first washcoat region may be a first washcoat zone and the second washcoat region may be a second washcoat zone. The second washcoat region/zone may be in contact with the first washcoat region/zone [i.e. the second washcoat region/zone is adjacent to, or abuts, the first washcoat region/zone]. Alternatively, the first washcoat region/zone and the second washcoat region/zone may be separated (e.g. by a gap).

When the third washcoat region is disposed directly on to the substrate, then the first washcoat region may be disposed directly on to the substrate (e.g. see FIGS. 8 and 10). The second washcoat region may be disposed or supported on the third washcoat region and/or the first washcoat region, preferably the second washcoat region is disposed or supported on the third washcoat region. The third washcoat region may be a third washcoat zone and the first washcoat region may be a first washcoat zone. The third washcoat region/zone may be in contact with the first washcoat region/zone [i.e. the third washcoat region/zone is adjacent to, or abuts, the first washcoat region/zone]. Alternatively, the first washcoat region/zone and the third washcoat region/zone may be separated (e.g. by a gap).

The second washcoat region may be a second washcoat layer or a second washcoat zone, preferably a second washcoat zone. When the second washcoat region is a second washcoat zone, the oxidation catalyst may further comprise a fourth washcoat region (e.g. see FIG. 10). The fourth washcoat region may be disposed or supported on the first washcoat zone. The fourth washcoat region may be in contact with the second washcoat zone [i.e. the fourth washcoat region is adjacent to, or abuts, the second washcoat zone]. Alternatively, the fourth washcoat region and the second washcoat zone may be separated (e.g. by a gap).

The fourth washcoat region may be a fourth washcoat zone.

The third washcoat region may be disposed or supported on the second washcoat region (e.g. see FIG. 9). The second washcoat region may be a second washcoat zone and the first washcoat region may be a first washcoat zone. The second washcoat region/zone may be in contact with the first washcoat region/zone [i.e. the second washcoat region/zone is adjacent to, or abuts, the first washcoat region/zone]. Alternatively, the first washcoat region/zone and the second washcoat region/zone may be separated (e.g. by a gap).

The third washcoat region may be a third washcoat layer or a third washcoat zone.

When the third washcoat region is a third washcoat zone, then the third washcoat zone may be disposed or supported on the second washcoat zone (e.g. see FIG. 7). The first washcoat region may be a first washcoat zone. The third washcoat zone may be in contact with the first washcoat zone [i.e. the third washcoat zone is adjacent to, or abuts, the first washcoat zone]. Alternatively, the first washcoat zone and the third washcoat zone may be separated (e.g. by a gap).

When the third washcoat region is a third washcoat zone, then the third washcoat zone may be disposed or supported on the first washcoat zone (e.g. see FIG. 9). The second washcoat region may be a second washcoat zone. The third washcoat zone may be in contact with the second washcoat zone [i.e. the third washcoat zone is adjacent to, or abuts, the second washcoat zone]. Alternatively, the second washcoat zone and the third washcoat zone may be separated (e.g. by a gap) and/or are not in contact (e.g. the second washcoat zone is not in physical contact with the third washcoat zone).

When the third washcoat region is a third washcoat layer, then the third washcoat layer may be disposed or supported on both the first washcoat region/zone and the second washcoat region/zone.

When the third washcoat region is a third washcoat zone, then the third washcoat zone typically has a length of 10 to 90% of the length of the substrate (e.g. 10 to 45%), preferably 15 to 75% of the length of the substrate (e.g. 15 to 40%), more preferably 20 to 70% (e.g. 30 to 65%, such as 25 to 45%) of the length of the substrate, still more preferably 25 to 65% (e.g. 35 to 50%).

The oxidation catalyst of the invention may comprise a zeolite catalyst. The third washcoat region and/or a fourth washcoat region may comprise the zeolite catalyst.

The third washcoat region may comprise, or consists essentially of, the zeolite catalyst.

The fourth washcoat region may comprise, or consist essentially of, the zeolite catalyst.

When the third washcoat region and the fourth washcoat region each comprise a zeolite catalyst, then the third washcoat region may comprise, or consist essentially of, a first zeolite catalyst and the fourth washcoat region may comprise, or consist essentially of, second zeolite catalyst, wherein the first zeolite catalyst is different (i.e. different composition) to the second zeolite catalyst. The first zeolite catalyst may be a zeolite catalyst as herein described above. The second zeolite catalyst may be a zeolite catalyst as herein described above.

When the third washcoat region comprises, or consists essentially, of the zeolite catalyst, then preferably the first washcoat region and/or the second washcoat region does not comprise the zeolite catalyst.

When a third washcoat region comprises, or consists essentially of, the zeolite catalyst, particularly the zeolite catalyst of the first or second zeolite catalyst embodiments, the temperature at which adsorbed $NO_x$ is released from the zeolite catalyst can be changed (i.e. increased) when the oxidation catalyst has a certain arrangement. An advantageous change (i.e. increase) in the temperature of the zeolite catalyst can be obtained when the second washcoat region is disposed or supported on the third washcoat region (see, for example, FIGS. 6, 8 and 10).

When a washcoat region comprises the zeolite catalyst, especially the third washcoat region and/or the fourth washcoat region, then the total loading of noble metal (i.e. of the zeolite catalyst in each washcoat region) is typically 1 to 250 g ft$^{-3}$ (e.g. 1 to 75 g ft$^{-3}$), preferably 5 to 150 g ft$^{-3}$ (e.g. 5 to 50 g ft$^{-3}$), more preferably 10 to 100 g ft$^{-3}$ (e.g. 10 to 40 g ft$^{-3}$).

Substrates for supporting oxidation catalysts for treating an exhaust gas from a diesel engine are well known in the art. Methods of making washcoats and applying washcoats onto a substrate are also known in the art (see, for example, our WO 99/47260, WO 2007/077462 and WO 2011/080525).

The substrate typically has a plurality of channels (e.g. for the exhaust gas to flow through). Generally, the substrate is a ceramic material or a metallic material.

It is preferred that the substrate is made or composed of cordierite ($SiO_2$—$Al_2O_3$—$MgO$), silicon carbide (SiC), Fe—Cr—Al alloy, Ni—Cr—Al alloy, or a stainless steel alloy.

Typically, the substrate is a monolith (also referred to herein as a substrate monolith). Such monoliths are well-known in the art. The substrate monolith may be a flow-through monolith or a filtering monolith.

A flow-through monolith typically comprises a honeycomb monolith (e.g. a metal or ceramic honeycomb monolith) having a plurality of channels extending therethrough, which channels are open at both ends. When the substrate is a flow-through monolith, then the oxidation catalyst of the invention is typically a diesel oxidation catalyst (DOC) or is for use as a diesel oxidation catalyst (DOC).

A filtering monolith generally comprises a plurality of inlet channels and a plurality of outlet channels, wherein the inlet channels are open at an upstream end (i.e. exhaust gas inlet side) and are plugged or sealed at a downstream end (i.e. exhaust gas outlet side), the outlet channels are plugged or sealed at an upstream end and are open at a downstream end, and wherein each inlet channel is separated from an outlet channel by a porous structure. When the substrate is a filtering monolith, then the oxidation catalyst of the invention is typically a catalysed soot filter (CSF) or is for use as a catalysed soot filter (CSF).

When the monolith is a filtering monolith, it is preferred that the filtering monolith is a wall-flow filter. In a wall-flow filter, each inlet channel is alternately separated from an outlet channel by a wall of the porous structure and vice versa. It is preferred that the inlet channels and the outlet channels are arranged in a honeycomb arrangement. When there is a honeycomb arrangement, it is preferred that the channels vertically and laterally adjacent to an inlet channel are plugged at an upstream end and vice versa (i.e. the channels vertically and laterally adjacent to an outlet channel are plugged at a downstream end). When viewed from either end, the alternately plugged and open ends of the channels take on the appearance of a chessboard.

In principle, the substrate may be of any shape or size. However, the shape and size of the substrate is usually selected to optimise exposure of the catalytically active materials in the catalyst to the exhaust gas. The substrate may, for example, have a tubular, fibrous or particulate form. Examples of suitable supporting substrates include a substrate of the monolithic honeycomb cordierite type, a substrate of the monolithic honeycomb SiC type, a substrate of the layered fibre or knitted fabric type, a substrate of the foam type, a substrate of the crossflow type, a substrate of the metal wire mesh type, a substrate of the metal porous body type and a substrate of the ceramic particle type.

In general, the oxidation catalyst of the invention is for use as a diesel oxidation catalyst (DOC) or a catalysed soot filter (CSF). In practice, catalyst formulations employed in DOCs and CSFs are similar. Generally, a principle difference between a DOC and a CSF is the substrate onto which the catalyst formulation is coated and the total amount of platinum, palladium and any other catalytically active metals that are coated onto the substrate.

It is to be understood that any reference to an oxidation catalyst of the invention for use as a diesel oxidation catalyst (DOC) may include passive $NO_x$ adsorber activity (DOC-PNA) or cold start catalyst activity (DOC-CSC).

The invention also provides an exhaust system comprising the oxidation catalyst and an emissions control device. Examples of an emissions control device include a diesel particulate filter (DPF), a lean $NO_x$ trap (LNT), a lean $NO_x$ catalyst (LNC), a selective catalytic reduction (SCR) catalyst, a diesel oxidation catalyst (DOC), a catalysed soot filter (CSF), a selective catalytic reduction filter (SCRF™) catalyst, an ammonia slip catalyst (ASC) and combinations of two or more thereof. Such emissions control devices are all well known in the art.

Some of the aforementioned emissions control devices have filtering substrates. An emissions control device having a filtering substrate may be selected from the group consisting of a diesel particulate filter (DPF), a catalysed soot filter (CSF), and a selective catalytic reduction filter (SCRF™) catalyst.

It is preferred that the exhaust system comprises an emissions control device selected from the group consisting of a lean $NO_x$ trap (LNT), an ammonia slip catalyst (ASC), diesel particulate filter (DPF), a selective catalytic reduction (SCR) catalyst, a catalysed soot filter (CSF), a selective catalytic reduction filter (SCRF™) catalyst, and combinations of two or more thereof. More preferably, the emissions control device is selected from the group consisting of a diesel particulate filter (DPF), a selective catalytic reduction (SCR) catalyst, a catalysed soot filter (CSF), a selective catalytic reduction filter (SCRF™) catalyst, and combinations of two or more thereof. Even more preferably, the emissions control device is a selective catalytic reduction (SCR) catalyst or a selective catalytic reduction filter (SCRF™) catalyst.

When the exhaust system of the invention comprises an SCR catalyst or an SCRF™ catalyst, then the exhaust system may further comprise an injector for injecting a nitrogenous reductant, such as ammonia, or an ammonia precursor, such as urea or ammonium formate, preferably urea, into exhaust gas downstream of the oxidation catalyst and upstream of the SCR catalyst or the SCRF™ catalyst. Such an injector may be fluidly linked to a source (e.g. a tank) of a nitrogenous reductant precursor. Valve-controlled dosing of the precursor into the exhaust gas may be regulated by suitably programmed engine management means and closed loop or open loop feedback provided by sensors monitoring the composition of the exhaust gas. Ammonia can also be generated by heating ammonium carbamate (a solid) and the ammonia generated can be injected into the exhaust gas.

Alternatively or in addition to the injector, ammonia can be generated in situ (e.g. during rich regeneration of a LNT disposed upstream of the SCR catalyst or the SCRF™ catalyst). Thus, the exhaust system may further comprise an engine management means for enriching the exhaust gas with hydrocarbons.

The SCR catalyst or the SCRF™ catalyst may comprise a metal selected from the group consisting of at least one of Cu, Hf, La, Au, In, V, lanthanides and Group VIII transition metals (e.g. Fe), wherein the metal is supported on a refractory oxide or molecular sieve. The metal is preferably selected from Ce, Fe, Cu and combinations of any two or more thereof, more preferably the metal is Fe or Cu.

The refractory oxide for the SCR catalyst or the SCRF™ catalyst may be selected from the group consisting of $Al_2O_3$, $TiO_2$, $CeO_2$, $SiO_2$, $ZrO_2$ and mixed oxides containing two or more thereof. The non-zeolite catalyst can also include tungsten oxide (e.g. $V_2O_5/WO_3/TiO_2$, $WO_x/CeZrO_2$, $WO_x/ZrO_2$ or $Fe/WO_x/ZrO_2$).

It is particularly preferred when an SCR catalyst, an SCRF™ catalyst or a washcoat thereof comprises at least one molecular sieve, such as an aluminosilicate zeolite or a SAPO. The at least one molecular sieve can be a small, a medium or a large pore molecular sieve. By "small pore molecular sieve" herein we mean molecular sieves containing a maximum ring size of 8, such as CHA; by "medium pore molecular sieve" herein we mean a molecular sieve containing a maximum ring size of 10, such as ZSM-5; and by "large pore molecular sieve" herein we mean a molecular sieve having a maximum ring size of 12, such as beta. Small pore molecular sieves are potentially advantageous for use in SCR catalysts.

In the exhaust system of the invention, preferred molecular sieves for an SCR catalyst or an SCRF™ catalyst are synthetic aluminosilicate zeolite molecular sieves selected from the group consisting of AEI, ZSM-5, ZSM-20, ERI including ZSM-34, mordenite, ferrierite, BEA including Beta, Y, CHA, LEV including Nu-3, MCM-22 and EU-1, preferably AEI or CHA, and having a silica-to-alumina ratio of about 10 to about 50, such as about 15 to about 40.

In a first exhaust system embodiment, the exhaust system comprises the oxidation catalyst of the invention, preferably as a DOC, and a catalysed soot filter (CSF). Such an arrangement may be called a DOC/CSF. The oxidation catalyst is typically followed by (e.g. is upstream of) the catalysed soot filter (CSF). Thus, for example, an outlet of the oxidation catalyst is connected to an inlet of the catalysed soot filter.

In a second exhaust system embodiment, the exhaust system comprises a diesel oxidation catalyst and the oxidation catalyst of the invention, preferably as a catalysed soot filter (CSF). This arrangement may also be called a DOC/CSF arrangement. Typically, the diesel oxidation catalyst (DOC) is followed by (e.g. is upstream of) the oxidation catalyst of the invention. Thus, an outlet of the diesel oxidation catalyst is connected to an inlet of the oxidation catalyst of the invention.

A third exhaust system embodiment relates to an exhaust system comprising the oxidation catalyst of the invention, preferably as a DOC, a catalysed soot filter (CSF) and a selective catalytic reduction (SCR) catalyst. Such an arrangement may be called a DOC/CSF/SCR and is a preferred exhaust system for a light-duty diesel vehicle. The oxidation catalyst is typically followed by (e.g. is upstream of) the catalysed soot filter (CSF). The catalysed soot filter is typically followed by (e.g. is upstream of) the selective catalytic reduction (SCR) catalyst. A nitrogenous reductant injector may be arranged between the catalysed soot filter (CSF) and the selective catalytic reduction (SCR) catalyst. Thus, the catalysed soot filter (CSF) may be followed by (e.g. is upstream of) a nitrogenous reductant injector, and the nitrogenous reductant injector may be followed by (e.g. is upstream of) the selective catalytic reduction (SCR) catalyst.

A fourth exhaust system embodiment relates to an exhaust system comprising a diesel oxidation catalyst (DOC), the oxidation catalyst of the invention, preferably as a catalysed soot filter (CSF), and a selective catalytic reduction (SCR) catalyst. This is also a DOC/CSF/SCR arrangement. The diesel oxidation catalyst (DOC) is typically followed by (e.g. is upstream of) the oxidation catalyst of the invention. The oxidation catalyst of the invention is typically followed by (e.g. is upstream of) the selective catalytic reduction (SCR) catalyst. A nitrogenous reductant injector may be arranged between the oxidation catalyst and the selective catalytic reduction (SCR) catalyst. Thus, the oxidation catalyst may be followed by (e.g. is upstream of) a nitrogenous reductant injector, and the nitrogenous reductant injector may be followed by (e.g. is upstream of) the selective catalytic reduction (SCR) catalyst.

In a fifth exhaust system embodiment, the exhaust system comprises the oxidation catalyst of the invention, preferably as a DOC, a selective catalytic reduction (SCR) catalyst and either a catalysed soot filter (CSF) or a diesel particulate filter (DPF). The arrangement is either a DOC/SCR/CSF or a DOC/SCR/DPF.

In the fifth exhaust system embodiment, the oxidation catalyst of the invention is typically followed by (e.g. is upstream of) the selective catalytic reduction (SCR) catalyst. A nitrogenous reductant injector may be arranged between the oxidation catalyst and the selective catalytic reduction (SCR) catalyst. Thus, the oxidation catalyst may be followed by (e.g. is upstream of) a nitrogenous reductant injector, and the nitrogenous reductant injector may be followed by (e.g. is upstream of) the selective catalytic reduction (SCR) catalyst. The selective catalytic reduction (SCR) catalyst are followed by (e.g. are upstream of) the catalysed soot filter (CSF) or the diesel particulate filter (DPF).

A sixth exhaust system embodiment comprises the oxidation catalyst of the invention, preferably as a DOC, and a selective catalytic reduction filter (SCRF™) catalyst. Such an arrangement may be called a DOC/SCRF™. The oxidation catalyst of the invention is typically followed by (e.g. is upstream of) the selective catalytic reduction filter (SCRF™) catalyst. A nitrogenous reductant injector may be arranged between the oxidation catalyst and the selective catalytic reduction filter (SCRF™) catalyst. Thus, the oxidation catalyst may be followed by (e.g. is upstream of) a nitrogenous reductant injector, and the nitrogenous reductant injector may be followed by (e.g. is upstream of) the selective catalytic reduction filter (SCRF™) catalyst.

In each of the third to sixth exhaust system embodiments described hereinabove, an ASC catalyst can be disposed downstream from the SCR catalyst or the SCRF™ catalyst (i.e. as a separate substrate monolith), or more preferably a zone on a downstream or trailing end of the substrate monolith comprising the SCR catalyst can be used as a support for the ASC.

Another aspect of the invention relates to a vehicle or an apparatus. The vehicle or apparatus comprises a diesel engine. The diesel engine may be a homogeneous charge compression ignition (HCCI) engine, a pre-mixed charge compression ignition (PCCI) engine or a low temperature combustion (LTC) engine. It is preferred that the diesel engine is a conventional (i.e. traditional) diesel engine.

The vehicle may be a light-duty diesel vehicle (LDV), such as defined in US or European legislation. A light-duty diesel vehicle typically has a weight of <2840 kg, more preferably a weight of <2610 kg.

In the US, a light-duty diesel vehicle (LDV) refers to a diesel vehicle having a gross weight of ≤8,500 pounds (US lbs). In Europe, the term light-duty diesel vehicle (LDV) refers to (i) passenger vehicles comprising no more than eight seats in addition to the driver's seat and having a maximum mass not exceeding 5 tonnes, and (ii) vehicles for the carriage of goods having a maximum mass not exceeding 12 tonnes.

Alternatively, the vehicle may be a heavy-duty diesel vehicle (HDV), such as a diesel vehicle having a gross weight of >8,500 pounds (US lbs), as defined in US legislation.

The invention also provides a method of modulating the content of $NO_x$ in an exhaust gas from a diesel engine for an emissions control device. The step of (b) passing the treated exhaust gas to an emissions control device typically involves directly passing the treated exhaust gas to the emissions control device. Thus, an outlet of the oxidation catalyst is directly connected (e.g. without intermediary) to an inlet of the emissions control device.

Typically, the emissions control device is a selective catalytic reduction (SCR) catalyst, a selective catalytic reduction filter (SCRF™) catalyst, a diesel particulate filter (DPF), or a catalysed soot filter (CSF). It is preferred that the emissions control device is a selective catalytic reduction (SCR) catalyst or a selective catalytic reduction filter (SCRF™) catalyst.

Any reference to "modulating the content of $NO_x$" as used herein, particularly in relation to method or use aspects of the invention, refers to changing (i.e. adjusting) or maintaining, preferably changing, the ratio (in ppm or % volume, typically at the temperature and pressure of the exhaust gas) of $NO:NO_2$ to be within a predefined ratio at a specific exhaust gas temperature or temperature range. The predefined ratio is typically less than 17:3, preferably to be from 5:1 to 1:5, more preferably 2.5:1 to 1:2.5, and even more preferably 2:1 to 1:2 (e.g. 1.5:1 to 1:1.5 or about 1:1).

The invention also relates to the use of the oxidation catalyst in the regeneration of an emissions control device having a filtering substrate (e.g. a downstream emissions control device having a filtering substrate).

The emissions control device having a filtering substrate may be selected from the group consisting of a diesel particulate filter (DPF), a catalysed soot filter (CSF), a selective catalytic reduction filter (SCRF™) catalyst and a combination of two or more thereof.

When the oxidation catalyst of the invention is used in the regeneration of an emissions control device having a filtering substrate, it may be used in the active or passive regeneration of the emissions control device, preferably the active regeneration.

The oxidation catalyst may be used to regenerate the emissions control device having a filtering substrate at a temperature of at least 220° C., preferably at least 240° C., more preferably at least 260° C., still more preferably at least 280° C., by oxidising nitric oxide (NO) to nitrogen dioxide ($NO_2$).

Definitions

The term "washcoat" is well known in the art and refers to an adherent coating that is applied to a substrate usually during production of a catalyst.

The term "washcoat region" as used herein refers to an area of washcoat on a substrate. A "washcoat region" can, for example, be disposed or supported on a substrate as a "layer" or a "zone". The area or arrangement of a washcoat on a substrate is generally controlled during the process of applying the washcoat to the substrate. The "washcoat region" typically has distinct boundaries or edges (i.e. it is possible to distinguish one washcoat region from another washcoat region using conventional analytical techniques).

Typically, the "washcoat region" has a substantially uniform length. The reference to a "substantially uniform length" in this context refers to a length that does not deviate (e.g. the difference between the maximum and minimum length) by more than 10%, preferably does not deviate by more than 5%, more preferably does not deviate by more than 1%, from its mean value.

It is preferable that each "washcoat region" has a substantially uniform composition (i.e. there is no substantial difference in the composition of the washcoat when comparing one part of the washcoat region with another part of that washcoat region). Substantially uniform composition in this context refers to a material (e.g. washcoat region) where the difference in composition when comparing one part of the washcoat region with another part of the washcoat region is 5% or less, usually 2.5% or less, and most commonly 1% or less.

The term "washcoat zone" as used herein refers to a washcoat region having a length that is less than the total length of the substrate, such as ≤75% of the total length of the substrate. A "washcoat zone" typically has a length (i.e.

a substantially uniform length) of at least 5% (e.g. ≥5%) of the total length of the substrate.

The total length of a substrate is the distance between its inlet end and its outlet end (e.g. the opposing ends of the substrate).

Any reference to a "washcoat zone disposed at an inlet end of the substrate" used herein refers to a washcoat zone disposed or supported on a substrate where the washcoat zone is nearer to an inlet end of the substrate than the washcoat zone is to an outlet end of the substrate. Thus, the midpoint of the washcoat zone (i.e. at half its length) is nearer to the inlet end of the substrate than the midpoint is to the outlet end of the substrate. Similarly, any reference to a "washcoat zone disposed at an outlet end of the substrate" used herein refers to a washcoat zone disposed or supported on a substrate where the washcoat zone is nearer to an outlet end of the substrate than the washcoat zone is to an inlet end of the substrate. Thus, the midpoint of the washcoat zone (i.e. at half its length) is nearer to the outlet end of the substrate than the midpoint is to the inlet end of the substrate.

When the substrate is a wall-flow filter, then generally any reference to a "washcoat zone disposed at an inlet end of the substrate" refers to a washcoat zone disposed or supported on the substrate that is:
(a) nearer to an inlet end (e.g. open end) of an inlet channel of the substrate than the washcoat zone is to a closed end (e.g. blocked or plugged end) of the inlet channel, and/or
(b) nearer to a closed end (e.g. blocked or plugged end) of an outlet channel of the substrate than the washcoat zone is to an outlet end (e.g. open end) of the outlet channel.

Thus, the midpoint of the washcoat zone (i.e. at half its length) is (a) nearer to an inlet end of an inlet channel of the substrate than the midpoint is to the closed end of the inlet channel, and/or (b) nearer to a closed end of an outlet channel of the substrate than the midpoint is to an outlet end of the outlet channel.

Similarly, any reference to a "washcoat zone disposed at an outlet end of the substrate" when the substrate is a wall-flow filter refers to a washcoat zone disposed or supported on the substrate that is:
(a) nearer to an outlet end (e.g. an open end) of an outlet channel of the substrate than the washcoat zone is to a closed end (e.g. blocked or plugged) of the outlet channel, and/or
(b) nearer to a closed end (e.g. blocked or plugged end) of an inlet channel of the substrate than it is to an inlet end (e.g. an open end) of the inlet channel.

Thus, the midpoint of the washcoat zone (i.e. at half its length) is (a) nearer to an outlet end of an outlet channel of the substrate than the midpoint is to the closed end of the outlet channel, and/or (b) nearer to a closed end of an inlet channel of the substrate than the midpoint is to an inlet end of the inlet channel.

A washcoat zone may satisfy both (a) and (b) when the washcoat is present in the wall of the wall-flow filter (i.e. the washcoat zone is in-wall).

The acronym "PGM" as used herein refers to "platinum group metal". The term "platinum group metal" generally refers to a metal selected from the group consisting of Ru, Rh, Pd, Os, Ir and Pt, preferably a metal selected from the group consisting of Ru, Rh, Pd, Ir and Pt. In general, the term "PGM" preferably refers to a metal selected from the group consisting of Rh, Pt and Pd.

The term "mixed oxide" as used herein generally refers to a mixture of oxides in a single phase, as is conventionally known in the art. The term "composite oxide" as used herein generally refers to a composition of oxides having more than one phase, as is conventionally known in the art.

Any reference to washcoat zones that do not "substantially overlap" as used herein refers an overlap (i.e. between the ends of neighbouring zones on a substrate) of less than 10% of the length of the substrate, preferably less 7.5% of the length of the substrate, more preferably less than 5% of the length of the substrate, particularly less than 2.5% of the length of the substrate, even more preferably less than 1% of the length of the substrate, and most preferably there is no overlap.

The expression "consist essentially" as used herein limits the scope of a feature to include the specified materials, and any other materials or steps that do not materially affect the basic characteristics of that feature, such as for example minor impurities. The expression "consist essentially of" embraces the expression "consisting of".

The expression "substantially free of" as used herein with reference to a material, typically in the context of the content of a washcoat region, a washcoat layer or a washcoat zone, means that the material in a minor amount, such as ≤5% by weight, preferably ≤2% by weight, more preferably ≤1% by weight. The expression "substantially free of" embraces the expression "does not comprise".

Any reference to an amount of dopant, particularly a total amount, expressed as a % by weight as used herein refers to the weight of the support material or the refractory metal oxide thereof.

EXAMPLES

The invention will now be illustrated by the following non-limiting examples.

Example 1

A first slurry was prepared as follows: silica-alumina powder was slurried in water and milled to a $d_{90}$<20 micron. Soluble platinum salt was added followed by manganese nitrate. The mixture was stirred to homogenise.

The slurry was applied to the outlet end of a cordierite flow through monolith having 400 cells per square inch using established coating techniques. It was then dried and calcined at 500° C. The Pt loading on the part was 15 g ft$^{-3}$. The manganese loading on the part was 50 g ft$^{-3}$.

A second slurry was prepared by taking silica-alumina powder and milling to a $d_{90}$<20 micron. Barium acetate was added to the slurry followed by appropriate amounts of soluble platinum and palladium salts. Beta zeolite was added such that the slurry comprised 77% silica-alumina and 23% zeolite by mass. The slurry was then stirred to homogenise. The resulting washcoat was applied to the inlet channels of the flow through monolith using established coating techniques. The part was dried and calcined at 500° C. The finished catalyst had a total Pt loading of 45 g ft$^{-3}$ and a Pd loading of 15 g ft$^{-3}$.

Example 2

A first slurry was prepared and applied to a cordierite flow through monolith having 400 cells per square using the same methods of Example 1. The Pt loading on the part was 15 g ft$^{-3}$. The manganese loading on the part was 50 g ft$^{-3}$.

A second slurry was prepared by taking silica-alumina powder and milling to a $d_{90}$<20 micron. Soluble platinum salt was added followed by manganese nitrate. Beta zeolite was added such that the slurry comprised 77% silica-alumina and 23% zeolite by mass. The slurry was then stirred to homogenise. The resulting washcoat was applied to the inlet channels of the flow through monolith using established coating techniques. The part was dried and calcined at 500° C. The finished catalyst had a total Pt loading of 54 g ft$^{-3}$ and manganese loading of 100 g ft$^{-3}$.

Experimental Results
Measurement of Oxidation Activity

Core samples were taken from each of the catalysts of Examples 1 and 2. The cores were hydrothermally "aged" in an oven at 750° C. for 15 hours using 10% water. Catalytic activity was determined using a synthetic gas bench test. The cores were tested in a simulated catalyst activity testing (SCAT) gas apparatus using the inlet gas mixture in Table 1. In each case the balance is nitrogen. The oxidation activity for CO and HC is determined by the light off temperature whereby 50% conversion is achieved (T50). The oxidation activity for NO is determined as the percentage conversion at 300° C.

TABLE 1

| | |
|---|---|
| CO | 1500 ppm |
| HC (as $C_1$) | 430 ppm |
| NO | 100 ppm |
| $CO_2$ | 4% |
| $H_2O$ | 4% |
| $O_2$ | 14% |
| Space velocity | 55000/hour |

Results

The results from the SCATs are shown in Table 2 below.

TABLE 2

| Example No. | T50 CO light off (° C.) | T50 HC light off (° C.) | NO oxidation at 300° C. (%) |
|---|---|---|---|
| 1 | 173 | 190 | 19 |
| 2 | 176 | 190 | 30 |

Results in Table 2 show that Examples 1 and 2 have very similar T50 light off temperatures for CO and HC. This means Examples 1 and 2 have very similar CO and HC oxidation activity. Example 2 comprises both platinum and manganese on the inlet coating as well as the outlet coating. Example 1 comprises both platinum and manganese on the outlet coating only. Example 2 has higher NO oxidation performance at 300° C. than Example 1.

Example 3

Silica-alumina powder was slurried in water and milled to a $d_{90}$<20 micron. Appropriate amounts of soluble platinum and palladium salts were added. The mixture was stirred to homogenise. The washcoat was applied to a cordierite flow through monolith having 400 cells per square inch using established coating techniques. It was then dried and calcined at 500° C. The overall PGM loading for the part was 60 g ft$^{-3}$. The ratio of Pt:Pd was 4:1 by mass.

Example 4

Silica-alumina powder was slurried in water and milled to a $d_{90}$<20 micron. Appropriate amounts of soluble platinum and palladium salts were added followed by manganese nitrate. The mixture was stirred to homogenise. The washcoat was applied to a cordierite flow through monolith having 400 cells per square inch using established coating techniques. It was then dried and calcined at 500° C. The overall PGM loading for the part was 60 g ft$^{-3}$. The ratio of Pt:Pd was 4:1 by mass. The manganese loading was 100 g ft$^{-3}$.

Example 5

Silica-alumina powder was slurried in water and milled to a $d_{90}$<20 micron. Appropriate amounts of soluble platinum and palladium salts were added. The mixture was stirred to homogenise. The washcoat was applied to a cordierite flow through monolith having 400 cells per square inch using established coating techniques. It was then dried and calcined at 500° C. The overall PGM loading for the part was 60 g ft$^{-3}$. The ratio of Pt:Pd was 10:1 by mass.

Example 6

Silica-alumina powder was slurried in water and milled to a $d_{90}$<20 micron. Appropriate amounts of soluble platinum and palladium salts were added followed by manganese nitrate. The mixture was stirred to homogenise. The washcoat was applied to a cordierite flow through monolith having 400 cells per square inch using established coating techniques. It was then dried and calcined at 500° C. The overall PGM loading for the part was 60 g ft$^{-3}$. The ratio of Pt:Pd was 10:1 by mass. The manganese loading was 100 g ft$^{-3}$.

Experimental Results
Measurement of Oxidation Activity

Core samples were taken from each of the catalysts of Examples 3, 4, 5 and 6. The cores were hydrothermally "aged" in an oven at 800° C. for 16 hours using 10% water. The catalytic activity was determined using a synthetic gas bench test. The cores were tested in a simulated catalyst activity testing (SCAT) gas apparatus using the inlet gas mixture in Table 1. In each case the balance is nitrogen. The oxidation activity for CO and HC is determined by the light off temperature whereby 50% conversion is achieved (T50).

Results

The results from the SCATs are shown in Table 3 below.

TABLE 3

| Example No. | T50 CO light off (° C.) | T50 HC light off (° C.) |
|---|---|---|
| 3 | 182 | 191 |
| 4 | 172 | 191 |
| 5 | 196 | 202 |
| 6 | 172 | 197 |

Results in Table 3 show the CO and HC T50 light off temperatures for Examples 3, 4, 5 and 6. Examples 3 and 4 have the same precious metal loading and a Pt:Pd weight ratio of 4:1. Example 4 which comprises manganese has a lower CO T50 light off temperature than Example 3 which does not comprise manganese. The HC T50 light off temperature for Examples 3 and 4 are identical. Examples 5 and 6 have the same precious metal loading and Pt:Pd weight ratio of 10:1. Example 6 which comprises manganese has lower CO and HC T50 light off temperatures than Example 5 which does not comprise manganese.

A greater improvement in light off temperature is seen with the catalyst containing manganese at a Pt:Pd weight ratio of 10:1 than at 4:1.

Example 7

Silica-alumina powder was slurried in water and milled to a $d_{90}$<20 micron. Soluble platinum salt was added and mixture stirred to homogenise. The slurry was applied to a cordierite flow through monolith having 400 cells per square inch using established coating techniques. It was then dried and calcined at 500° C. The Pt loading on the part was 30 g ft$^{-3}$.

Example 8

The method of Example 1 was repeated, except that soluble platinum salt was added followed by manganese nitrate before stirring the mixture to homogenise. The Pt loading on the part was 30 g ft$^{-3}$. The manganese loading on the part was 40 g ft$^{-3}$. The weight ratio of Pt to manganese was 3:4.

Example 9

The method of Example 2 was used, except that alumina powder was slurried in water and milled to a $d_{90}$<20 micron instead of silica-alumina powder. The Pt loading on the part was 30 g ft$^{-3}$. The manganese loading on the part was 40 g ft$^{-3}$. The weight ratio of Pt to manganese was 3:4.

Example 10

Silica doped alumina powder was slurried in water and milled to a $d_{90}$<20 micron. Barium acetate was added to the slurry followed by appropriate amounts of soluble platinum and palladium salts. Beta zeolite was added such that the slurry comprised 78% silica doped alumina and 22% zeolite by mass. The slurry was then stirred to homogenise. The resulting washcoat was applied to the inlet channels of a cordierite flow through monolith having 400 cells per square inch using established coating techniques, and then dried.

A second slurry was prepared by taking silica-doped alumina powder and milling to a $d_{90}$<20 micron. Soluble platinum salt was added to the slurry followed by a manganese nitrate solution. The slurry was stirred to homogenise. This second slurry was applied to the outlet channels of the flow through monolith using conventional coating techniques. The part was dried and then calcined at 500° C. The finished catalyst had a total PGM loading of 75 g ft$^{-3}$ and a manganese loading on the outlet coating of 100 g ft$^{-3}$. The weight ratio of platinum to manganese was 3:5.

Example 11

Silica doped alumina powder was slurried in water and milled to a $d_{90}$<20 micron. Barium acetate was added to the slurry followed by appropriate amounts of soluble platinum and palladium salts. Beta zeolite was added such that the slurry comprised 78% silica doped alumina and 22% zeolite by mass. The slurry was then stirred to homogenise. The resulting washcoat was applied to the inlet channels of a cordierite flow through monolith having 400 cells per square inch using established coating techniques, and then dried.

A second slurry was prepared by taking silica-doped alumina powder and milling to a $d_{90}$<20 micron. An appropriate amount of soluble platinum salt was added to the slurry and it was stirred to homogenise. This second slurry was applied to the outlet channels of the flow through monolith using conventional coating techniques. The part was dried and then calcined at 500° C. The finished catalyst had a total PGM loading of 75 g ft$^{-3}$.

Experimental Results
Measurement of NO Oxidation

Core samples were taken from each of the catalysts of Examples 1 to 5. All cores were hydrothermally "aged" in an oven at 750° C. for 15 hours. Additional cores were taken from Examples 4 and 5 and kept in the "fresh" condition (i.e. they were kept without any oven thermal treatment).

The catalytic activity was determined using a synthetic gas bench activity test (SCAT). The fresh and aged cores were tested in a simulated catalyst activity testing (SCAT) gas apparatus using the inlet gas mixtures in Table 1. In each case the balance is nitrogen.

Results

The results from the SCATs are shown in Tables 4 to 6 below.

TABLE 4

| Example No. | NO oxidation at 250° C. (%) (Aged condition) |
| --- | --- |
| 7 | 43 |
| 8 | 62 |
| 9 | 49 |

The results in Table 4 show the NO oxidation performance of Examples 7, 8 and 9 at 250° C. Example 7 (does not comprise manganese) has the lowest NO oxidation activity. Example 8 (comprises manganese and a silica-alumina support) has the highest NO oxidation activity. Example 9 (comprises manganese and an alumina support) has an intermediate NO oxidation activity. The inclusion of manganese results in improved NO oxidation performance. The results for Example 8 indicate that the combination of manganese with a support material comprising a doped alumina, such as a silica doped alumina, is particularly advantageous.

The results for Examples 10 and 11 are shown in Tables 5 and 6.

TABLE 5

| Example No. | NO oxidation at 200° C. (%) (Fresh condition) | NO oxidation at 200° C. (%) (Aged condition) |
| --- | --- | --- |
| 10 | 31 | 39 |
| 11 | 44 | 25 |

The results in Table 5 show that the catalyst of Example 10 (comprises manganese in the Pt zone) in the aged condition at 200° C. has greater NO oxidation performance than the catalyst of Example 11.

TABLE 6

| Example No. | NO oxidation at 220° C. (%) (Fresh condition) | NO oxidation at 220° C. (%) (Aged condition) |
| --- | --- | --- |
| 10 | 55 | 55 |
| 11 | 59 | 47 |

The results in Table 6 show that the catalyst of Example 10 in the aged condition at 220° C. shows better NO oxidation activity than the catalyst of Example 11.

Tables 5 and 6 also show that the difference in NO oxidation activity between the fresh and aged conditions of the catalyst is smaller for Example 10 than for Example 11. Thus, the catalyst of Example 10 shows more stable NO oxidation performance than Example 11. A stable NO oxidation performance between fresh and aged conditions is advantageous for downstream SCR dosing calibrations.

Example 12

Pd nitrate was added to slurry of small pore zeolite with CHA structure and was stirred. The slurry was applied to a cordierite flow through monolith having 400 cells per square inch structure using established coating techniques. The coating was dried and calcined at 500° C. A coating containing a Pd-exchanged zeolite was obtained. The Pd loading of this coating was 40 g ft$^{-3}$.

A second slurry was prepared using a silica-alumina powder milled to a $d_{90}$<20 micron.

Soluble platinum salt was added and the mixture was stirred to homogenise. The slurry was applied to the outlet end of the flow through monolith using established coating techniques. The coating was then dried.

A third slurry was prepared using a silica-alumina powder milled to a $d_{90}$<20 micron. Appropriate amounts of soluble platinum and palladium salts were added followed by beta zeolite such that the slurry comprised 75% silica doped alumina and 25% zeolite by mass. The slurry was then stirred to homogenise. The resulting washcoat was applied to the inlet channels of the flow through monolith using established coating techniques. The part was then dried and calcined at 500° C. The Pt loading of the finished part was 51 g ft$^{-3}$ and the Pd loading was 47.5 g ft$^{-3}$.

Example 13

Pd nitrate was added to slurry of small pore zeolite with CHA structure and was stirred. The slurry was applied to a cordierite flow through monolith having 400 cells per square inch structure using established coating techniques. The coating was dried and calcined at 500° C. A coating containing a Pd-exchanged zeolite was obtained. The Pd loading of this coating was 40 g ft$^{-3}$.

A second slurry was prepared using a 5% manganese supported on a silica-alumina powder milled to a $d_{90}$<20 micron. Soluble platinum salt was added and the mixture was stirred to homogenise. The slurry was applied to the outlet end of the flow through monolith using established coating techniques. The coating was then dried.

A third slurry was prepared using a silica-alumina powder milled to a $d_{90}$<20 micron. Appropriate amounts of soluble platinum and palladium salts were added followed by beta zeolite such that the slurry comprised 75% silica doped alumina and 25% zeolite by mass. The slurry was then stirred to homogenise. The resulting washcoat was applied to the inlet channels of the flow through monolith using established coating techniques. The part was then dried and calcined at 500° C. The Pt loading of the finished part was 51 g ft$^{-3}$ and the Pd loading was 47.5 g ft$^{-3}$.

Experimental Results

Measurement of NO Oxidation

Core samples were taken from the catalyst Examples 12 and 13. Both cores were hydrothermally aged in an oven at 800° C. for 16 hours in 10% water.

The catalytic activity was determined using a synthetic gas bench activity test (SCAT). The aged cores were tested in a simulated catalyst activity testing (SCAT) gas apparatus using the inlet gas mixtures in Table 1. In each case the balance is nitrogen.

Results

The results from the SCATs are shown in Table 7 below.

TABLE 7

| Example No. | NO oxidation at 250° C. (%) |
|---|---|
| 12 | 49 |
| 13 | 69 |

The results in Table 7 show the NO oxidation performance of Examples 12 and 13 at 250° C. Example 13 which comprises manganese shows a higher level of NO oxidation at 250° C. than Example 12.

For the avoidance of any doubt, the entire content of any and all documents cited herein is incorporated by reference into the present application.

The invention claimed is:

1. An oxidation catalyst for treating an exhaust gas from a diesel engine, wherein the oxidation catalyst comprises:
    a first washcoat zone for oxidizing carbon monoxide (CO) and hydrocarbons (HCs), which comprises platinum (Pt) and manganese (Mn) disposed or supported on a first support material, wherein the first support material comprises a refractory oxide comprising silica-alumina or alumina doped with silica;
    a second washcoat zone for oxidizing nitric oxide (NO) to nitrogen dioxide (NO$_2$), which comprises a platinum group metal (PGM), and manganese (Mn) disposed or supported on a second support material, wherein the second support material comprises a refractory oxide comprising alumina, and the platinum group metal (PGM) is selected from the group consisting of (i) platinum and (ii) a combination of platinum and palladium in a ratio of platinum to palladium by total weight of ≥2:1, and the second washcoat zone is substantially free of a zeolite; and
    a flow-through substrate monolith or a filtering substrate monolith having a length defined by an inlet end and an outlet end;
    wherein the first washcoat zone is compositionally different from the second washcoat zone, and wherein the second washcoat zone is disposed at an outlet end of the substrate monolith, and the first washcoat zone is disposed at an inlet end of the substrate monolith and wherein the first washcoat zone has a length of 10 to 90% of the length of the substrate monolith.

2. The oxidation catalyst of claim 1, wherein the first washcoat zone and the second washcoat zone are disposed on the substrate monolith as a single layer.

3. The oxidation catalyst of claim 1, wherein the first washcoat zone further comprises palladium.

4. The oxidation catalyst of claim 3, wherein the first washcoat zone comprises a ratio of platinum to palladium by total weight of ≥1:1.

5. The oxidation catalyst of claim 1, wherein the second support material comprises alumina doped with silica.

6. The oxidation catalyst of claim 1, wherein the second washcoat zone comprises platinum (Pt) as the only platinum group metal (PGM).

7. The oxidation catalyst of claim 1, wherein at least one of the first washcoat zone and the second washcoat zone is substantially free of palladium (Pd) disposed or supported on the second support material.

8. The oxidation catalyst of claim 1, wherein the second support material comprises a refractory oxide comprising silica-alumina.

9. The oxidation catalyst of claim 1, wherein the first washcoat zone comprises ≥40% of the total concentration of platinum group metal.

10. The oxidation catalyst of claim 1, wherein the total concentration of platinum in the first washcoat zone is greater than the total concentration of platinum group metal (PGM) in the second washcoat zone.

11. The oxidation catalyst of claim 1, wherein the first washcoat zone has a length of from 10 to 45% of the length of the substrate monolith.

12. The oxidation catalyst of claim 1, wherein the first washcoat zone and the second washcoat zone each has a length, wherein the length of the first washcoat zone is greater than the length of the second washcoat zone.

13. The oxidation catalyst of claim 1, wherein at least one of the first washcoat region and the second washcoat region do not comprise rhodium.

14. The oxidation catalyst of claim 1, wherein the first washcoat zone and the second washcoat zone are disposed directly on to the substrate monolith.

15. The oxidation catalyst of claim 1 further comprising a third washcoat layer disposed directly on to the substrate monolith, wherein the first washcoat zone and the second washcoat zone are each disposed or supported on the third washcoat layer, and wherein the third washcoat layer comprises a zeolite catalyst comprising a noble metal and a zeolite, wherein the noble metal is selected from the group consisting of palladium (Pd), platinum (Pt), rhodium (Rh), gold (Au), silver (Ag), iridium (Ir), ruthenium (Ru) and mixtures of two or more thereof.

16. The oxidation catalyst of claim 1, wherein the first washcoat zone does not comprise a zeolite.

17. The oxidation catalyst of claim 1, wherein the first washcoat zone comprises a zeolite, in a total amount of from 0.2 to 3.00 g in$^{-3}$.

18. An exhaust system for a diesel engine comprising an oxidation catalyst as defined in claim 1 and an emissions control device.

19. The exhaust system of claim 18, wherein the emissions control device is selected from the group consisting of a diesel particulate filter, a selective catalytic reduction catalyst, a catalyzed soot filter, a selective catalytic reduction filter catalyst, and combinations of two or more thereof.

20. A vehicle comprising a diesel engine and an exhaust system of claim 18.

\* \* \* \* \*